US012354002B1

(12) United States Patent
Weber

(10) Patent No.: US 12,354,002 B1
(45) Date of Patent: Jul. 8, 2025

(54) CUSTOMIZED MACHINE LEARNING MODELS

(71) Applicant: Amazon Technologies, Inc., Seattle, WA (US)

(72) Inventor: Frederick Weber, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 393 days.

(21) Appl. No.: 18/080,957

(22) Filed: Dec. 14, 2022

(51) Int. Cl.
  *G10L 15/00* (2013.01)
  *G06N 3/045* (2023.01)
  *G06N 3/0499* (2023.01)
  *G06N 3/08* (2023.01)
  *G10L 15/02* (2006.01)
  *G10L 15/06* (2013.01)
  *G10L 15/16* (2006.01)
  *G10L 15/22* (2006.01)

(52) U.S. Cl.
  CPC ............. *G06N 3/08* (2013.01); *G06N 3/045* (2023.01); *G06N 3/0499* (2023.01); *G10L 15/02* (2013.01); *G10L 15/063* (2013.01); *G10L 15/16* (2013.01); *G10L 15/22* (2013.01)

(58) Field of Classification Search
  CPC ....... G10L 15/16; G10L 19/005; G10L 19/00; G10L 25/27; G10L 25/30; G10L 15/02; G10L 15/063; G10L 15/12; G10L 15/08; G10L 15/20; G10L 15/07; G10L 15/22; G10L 15/26; G10L 15/30; G10L 15/00; G10L 15/14; G10L 15/1815; G10L 15/197; G10L 15/1822; G10L 15/183; G10L 15/193; G10L 15/19
  See application file for complete search history.

(56) References Cited

PUBLICATIONS

Cai, et al. "TinyTL: Reduce Activations, Not Trainable Parameters for Efficient On-Device Learning", 34th Conference on Neural Information Processing Systems (NeurIPS 2020), Jun. 6, 2021, pp. 1-14, https://arxiv.org/pdf/2007.11622.pdf.
Kumatani, et al. "Building a great multi-lingual teacher with sparsely-gated mixture of experts for speech recognition", Microsoft, Jan. 4, 2022, https://arxiv.org/pdf/2112.05820.pdf.
You, et al. "Speechmoe2: Mixture-of-Experts Model With Improved Routing", Nov. 23, 2021, https://ieeexplore.ieee.org/document/9747065.

(Continued)

*Primary Examiner* — Vu B Hang
(74) *Attorney, Agent, or Firm* — Pierce Atwood LLP

(57) ABSTRACT

An adapter layer may be used to customize a machine learning component by transforming data flowing into, out of, and/or within the machine learning component. The adapter layer may include a number of neural network components, or "adapters," configured to perform a transformation on input data. Neural network components may be configured into adapter groups. A router component can, based on the input data, select one or more neural network components for transforming the input data. The input layer may combine the results of any such transformations to yield adapted data. Different adapter groups can include adapters of different complexity (e.g., involving different amounts of computation and/or latency). Thus, the amount of computation or latency added by an adapter layer can be reduced for simpler transformations of the input data.

20 Claims, 11 Drawing Sheets

(56) References Cited

PUBLICATIONS

Gong, et al. "Layer-wise Fast Adaptation for End-to-End Multi-Accent Speech Recognition", Proc. Interspeech 2021, Apr. 21, 2022, https://arxiv.org/abs/2204.09883.

Fedus, et al. "Switch Transformers: Scaling to Trillion Parameter Models with Simple and Efficient Sparsity", Journal of Machine Learning Research 23, Jun. 16, 2022, pp. 1-40, https://arxiv.org/pdf/2101.03961.pdf.

Gulati, et al. "Conformer: Convolution-augmented Transformer for Speech Recognition", Google Inc., May 16, 2020, https://arxiv.org/pdf/2005.08100.pdf.

CUSTOMIZED MACHINE LEARNING MODELS

BACKGROUND

Computer systems may employ machine learning algorithms to perform tasks that may involve recognizing patterns and/or sequences in data and making inferences and/or predictions. Examples of machine learning algorithms include linear regression, logistic regression, artificial neural networks, decision tress, naïve Bayes, random forest, and others. Machine learning algorithms may process training data to build a model. A machine learning model may have many parameters (e.g., weights) trained using various techniques such as supervised learning, unsupervised learning, and/or reinforcement learning. Machine learning models have many applications.

BRIEF DESCRIPTION OF DRAWINGS

For a more complete understanding of the present disclosure, reference is now made to the following description taken in conjunction with the accompanying drawings.

DETAILED DESCRIPTION

Figure 1:
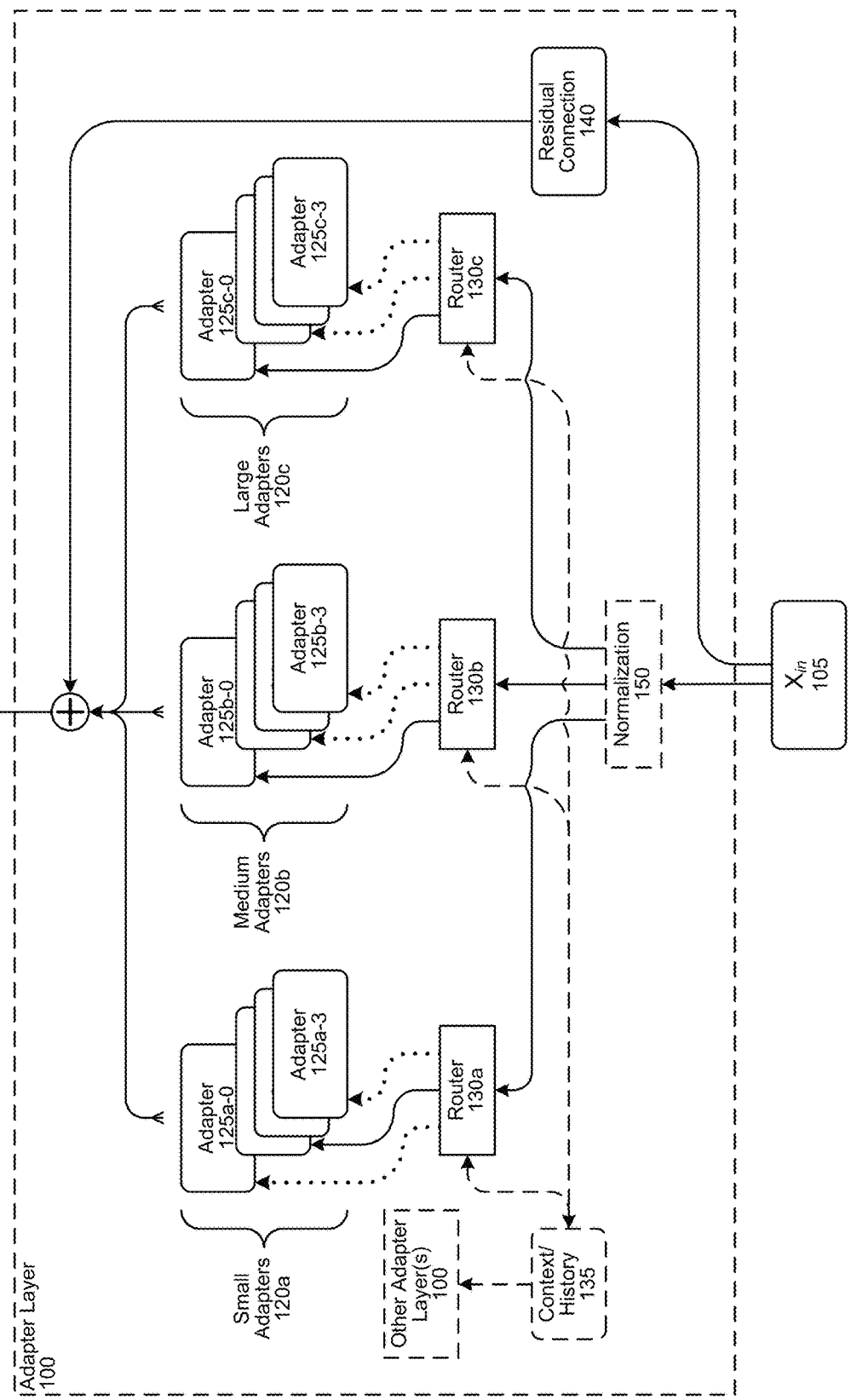
FIG. 1 is a conceptual diagram that illustrates an example adapter layer for use in a machine learning model, according to embodiments of the present disclosure.

Machine learning components may be trained and/or used to process data in various ways to, for example, extract useful information, classify things, make inferences or predictions, and/or generate new data. As a machine learning model is trained, it may grow in size by increasing a number of parameters and/or interconnections. If model size becomes problematic—e.g., by requiring too many resources to store, load, and/or execute—multiple specialized (e.g., customized) models may be substituted for one large model. Using multiple specialized models may present other challenges, however, as they may require more storage overall, time to load when one model is substituted for another, etc. The challenge of using large machine learning models may be particularly acute on user devices such as mobile phones, where memory, processing power, and/or bandwidth for providing updates may be especially limited, and/or when trying to achieve more climate-friendly solutions (even if in enterprise-level systems) that are more efficient.

Offered are systems and methods for, among other things, using an adapter layer, or multiple adapter layers, to customize a machine learning model in a manner that can be more efficient in terms of processing, latency and/or size (e.g., measured in number of bytes). An adapter layer may be a component (e.g., comprised of one or more relatively lightweight neural networks) trained to introduce a transformation to data flowing to, from, or within in the machine learning model. The transformation may include one or more mathematical operations such as a vector and/or matrix multiplication, where values of the vector/matrix may be determined through training. A transformation may represent, for example, an adjustment or correction to the data to improve the accuracy of downstream component such as a subsequent layer or block of the machine learning component or different machine learning component. An adapter layer may use multiple adapter components, as described below, to adapt the machine learning component to different conditions or characteristics of the input data, where an adapter may represent a particular transformation to modify the input data to account for a particular characteristic (or characteristics). An adapter may be embodied in, for example, a relatively lightweight neural network such as a feedforward network. The adapter may, in various implementations, include layers for performing down-projection, affine transformation, activation function, and/or up-projection, etc. The adapter(s) may improve the model's ability to accurately process input data corresponding to the characteristic in a manner that may be more efficient in terms of latency and size than simply growing the model.

The adapter layer(s) may be used to customize machine learning models for various applications including ASR, AED, and/or image processing such as feature extraction, text recognition, and/or object recognition. For example, an adapter layer may be included in a machine learning component used for speech recognition, and be configured through training to adapt the machine learning component to different dialects, background noises, and audio quality. Similarly, an adapter layer may be used to adapt AED or speaker identification components to the same kinds of background noises and audio quality. An adapter layer may be inserted in a machine learning component configured to perform object and/or text recognition in image data to adjust for rotation, pixilation, shadows, etc.

An adapter layer may be made up of a number of individual adapters, each configured to introduce a different transformation on the input data. The adapters may be organized into adapter groups. An adapter group may include a router component configured to determine, based on the input data, which adapter(s) of the adapter group to use to transform the input data. Different adapter groups may include adapters of different complexity; for example, adapters of a first adapter group may introduce a relatively simple transformation, adapters of a second adapter group may introduce a more complex transformation, and so on. In this manner, the adapter layer may be configured to perform simple transformation (e.g., involving fewer operations and/or lower latency) in some cases and more complex transformation (e.g., involving more operations and/or higher latency) in other cases, where doing so may improve accuracy or other aspect of performance of the machine learning component.

The routers and adapters of an adapter layer may be trained to determine, based on given input data, whether and/or how to transform that input data to generate adapted data that may be more useful for its ultimate purpose than the untransformed input data. Through training, a router may be trained classify input data into various categories corresponding to an adapter, and that adapter may be trained to adapt that category of input data or subsequent processing. For example, an adapter layer may be introduced into a speech recognition component to improve recognition of speech of certain dialects and/or in different acoustic settings. A first router may categorize, based on accent or dialect, input data representing features of audio data. The adapters of the first router's adapter group may transform the input data in a manner that corresponds to different pronunciations of phonemes (or other speech units) characteristic of a particular dialect. A second router may categorize the input data based on the acoustic environment (e.g., signal to noise ratio, the presence of background speech or other noise, etc.). The adapters of the second router's adapter group may transform the input data to reduce the influence of non-speech features. Thus the router(s) may be trained to select a particular adapter based on a given input, and individual adapters may be trained to improve the accuracy of the larger machine learning component for similar inputs. Successive adapter groups may be trained to perform more costly transformations (e.g., in terms of processing resources relative to the adapter group with the smallest/sparsest adapters) in cases where smaller adapters performing less costly transformations has not, or is not expected to, improve the performance of downstream processing. For example, adapting input data based on dialect may involve a simpler transformation (e.g., corresponding to pronunciation of a small subset of phonemes) than adapting input data to suppress background speech (e.g., where the background speech may be closer to the volume and pitch of the speech of interest than other environmental noises). Training of the adapter layer need to not be constrained to identifiable categories, and individual routers and adapters may be left free to categorize and adapt input data based on any classification system or no classification system at all. In other words, the routers and adapters of a trained adapter layer may not correspond to any identifiable category yet may still be useful in adapting input data having diverse characteristics in a manner that improves the accuracy of subsequent processing.

This technique may be referred to as a "Mixture of Tiny Experts," where each adapter in the adapter layer is an "expert," and the result of one or more adapter transformations (and, in some cases, a residual connection) may be combined to generate an adapted output. Downstream layers, blocks, and/or processes of the machine learning model and/or other component(s) may use the adapted output to perform additional machine learning tasks or other actions as described herein. The adapter layer(s) may be used with various types of machine learning models including, for example and without limitation, convolutional neural networks (CNNs), recurrent neural networks (RNNs) such as transformers, and/or neural network architectures that represent combinations of CNNs and RNNs such as conformers. The adapter layer(s) may be inserted between layers and/or blocks of various machine learning architectures and/or used to pre- or post-process data input to or output by a machine learning model. In some implementations, adapter layer(s) may substitute for other layers within a machine learning architecture (e.g., replacing a feed-forward module or layer within a conformer block). The adapter layer(s) may be used to customize machine learning models for various applications including ASR, speaker identification, AED, and/or image processing such as feature extraction, text recognition, and/or object recognition. Although illustrated below in CNNs and RNNs as used in ASR, speaker identification, AED, and image recognition, the techniques described herein can be applied to myriad machine learning components configured to extract features from various types of data.

These and other features of the disclosure are provided as examples, and maybe used in combination with each other and/or with additional features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram that illustrates an example adapter layer 100 for use in a machine learning model, according to embodiments of the present disclosure. The adapter layer may receive input data 105 ("$X_{in}$") and process it to generate output data 115 ("adapted data" or "$X_{adapted}$"). In some implementations, the input data 105 may represent, for example, raw data such as image data or frames of audio data (e.g., spectrograms). In some implementations, the input data 105 may represent feature data (e.g., feature activations/post-layer normalization activations) extracted from raw data by, for example, a previous machine learning component or layer/block of a machine learning component. In some implementations, the input data 105 may represent embedding data in an embedding space; for example, as generated by a neural network encoder. The adapter layer 100 can perform one or more transformations on the input data 105 to generate output data 115 for input into a subsequent machine learning component or layer/block of a machine learning component. "Adapted" the input data 105 may generate output data 115 that results in more accurate output of subsequent processing such as speech recognition, object recognition, acoustic event detection, etc. One or more adapter layers 100 can be used to, for example, improve the accuracy of a size-constrained machine learning component (e.g., on a user device such as a smart speaker, mobile phone, tablet computer, etc.) over a wider range of inputs.

The adapter layer 100 may include a number of adapter groups such as the small adapters 120a, the medium adapters 120b, the large adapters 120c, etc. (collectively "adapter groups 120"). In some implementations, there may be more or fewer adapter groups 120. An adapter group may include a number of adapters 125 such as the adapters 125*a*-0, 125*a*-1, 125*a*-2, 125*a*-3, etc. in the first adapter group 120*a*; the adapters 125*b*-0, 125*b*-1, 125*b*-2, 125*b*-3, etc. in the second adapter group 120*b*; and the adapters 125*c*-0, 125*c*-1, 125*c*-2, 125*c*-3, etc. in the third adapter group 120*c*, etc. In some implementations, there may be more or fewer adapters 125 in one or all the adapter groups 120. For example, in some implementations, the first adapter group 120*a* may include many small adapters (e.g., 8, 16, 32, etc.) while other adapter groups include fewer, but larger, adapters 125 (e.g., 4 adapters 125 in the second adapter group 120*b*, 2 adapters 125 in the third adapter group 120*c*, etc.). An adapter group 120 may include a router 130 such as the router 130*a* in the first adapter group 120*a*, the router 130*b* in the second adapter group 120*b*, the router 130*c* in the third adapter group 120*c*, etc. A router 130 may select one or more of the adapters 125 from a group for processing the input data 105. An adapter 125 may perform a transformation of the input data 105. Outputs of the adapters 125 may be combined to generate the output data 115. For example, the outputs of the adapters 125 may be combined using linear and/or non-linear functions including summing, averaging, weighted averaging (e.g., based on softmax values calculated by one or more of the routers 130), multiplying, and/or applying gating or some other activation function. In some implementations, the adapter layer 100 may use a residual connection 140—e.g., representing untransformed input data 105—to determine the output data 115. The residual connection 140 may be useful in the case where no adapters 125 are selected for processing the input data 105, thus the output data 115 from the adapter layer 100 will include a copy of the untransformed input data 105. In some implementations, the adapter layer 100 may include a normalization component 150. The normalization component 150 may perform one or more normalization operations including, but not limited to, a layer normalization, group normalization, and/or a batch normalization, etc., to prepare the input data 105 for adaptation. In some implementations, however, the input data 105 may undergo layer normalization prior to receipt by the adapter layer 100; for example, when the adapter layer 100 follows a machine learning block that ends with layer normalization (e.g., a conformer block). In some implementations, however, the adapter layer 100 may be inserted within a machine learning block or otherwise situated between machine learning layers, and may thus include layer normalization prior to performing routing and/or transformations.

An adapter 125 is a component that may perform a transformation on the input data 105 and output transformed data. A transformation may include arithmetic operations, such as a matrix multiplication, and/or linear or non-linear operations such as those performed by a neural network. In some implementations, an adapter 125 may be a feedfoward neural network. A feedforward neural network is a neural network having one or more layers and through which information flows in only one direction (e.g., from the input to the output and without cycles or loops). In some cases, the transformation may be a null transformation (e.g., multiplying the input data 105 by zero or a matrix of zeros to output a vector or matrix populated with zeros) or an identity transformation (e.g., multiplying the input data 105 by one or an identity matrix to output a vector or matrix that is the same as the input data 105). An adapter group 120 may include an adapter 125 that performs a null or identity transformation. The null/identity transformation may be applied when the adapter group 120 is not to affect the output data 115. The adapter group 120 may thus output a zero or a copy of the untransformed input data 105. An adapter group 120 performing an identity transformation may output the untransformed input data 105, thus performing the function of the residual connection 140. The router 130 may select an adapter 125 (including one that performs a null/identity transformation) based on the input data 105, as described further below.

A non-null/non-identity transformation may include a down-projection (e.g., using a dense neural network layer), an activation function (e.g., rectified linear unit "ReLU", leaky ReLU, parametric ReLU, exponential linear unit "ELU", etc.), followed by an up-projection. The down-projection may generate intermediate data representing an intermediate projection of the input data 105, and having reduced dimensionality from the input data 105. The up-projection may return the intermediate data to the same dimensionality as the input data 105. For example, the input data 105 may include vectors having 512 elements (or, depending on the application, matrices having 512×512 elements), and the down-projection may generate intermediate data including vectors having 64 elements (or matrices having 64×64 elements). In some implementations, the intermediate projection may have higher or lower dimensionality, or represent a more or less of a dimensionality reduction over the input data 105. In some implementations, the intermediate projection may have the same dimensionality as the input data 105 while one or more of the down-projection and/or up-projection may involve a sparse operation; for example, where the input data 105 and/or intermediate data is multiplied by a sparse matrix, where the non-zero (or non-identity) elements of the sparse matrix represent the transformation to be performed by the adapter. In some implementations, other transformations are possible including scaling, offset, and/or affine transformations, etc.

The sparsity and/or dimensionality reduction of an adapter 125 may correspond to its size, where the size of an adapter may correspond to a number and/or complexity of mathematical operations performed by the adapter, a number of bytes of memory space or bandwidth needed, and/or its latency in terms of time added to processing of the machine learning task of which it is a part. In some implementations, an adapter group 120 may include a set of adapters 125 having a same size (e.g., sparsity/dimensionality). In some implementations, each adapter group 120 may include successively larger adapters 125 (e.g., less sparse/less dimensionality reduction). In this manner, each adapter group 120 may be configured to perform transformations having different complexity. For example, based on an input data 105 made up of d=512 vectors (or 512×512 matrices), the first adapter group 120*a* may down-project (e.g., reduce the dimensionality of) the input data 105 to a dimensionality of 32×32, the second adapter group 120*b* may down-project to a dimensionality of 64, the third adapter group 120*c* may down-project to a dimensionality of 256, etc. In some implementations, different amounts of down-projection may be applied by the adapter groups 120. Additionally or alternatively, adapter 125 size may correspond to sparsity of matrices used in the transformations. For example, the first adapter group 120*a* may include a matrix that is 90% sparse (e.g., only 10% of the elements will be active/non-zero), the second adapter group 120*b* may include a matrix that is 75% sparse, the third adapter group 120*c* may include a matrix that is 50% sparse, etc. When configured in one of these manners, each adapter group 120 may be trained to perform transformations involving different levels of complexity (e.g., more or less computation and/or added latency). For example, in an ASR use case, the first adapter group 120*a* may perform adaptations for different dialects to adjust the encoding of a handful of different phonemes having a pronunciation particular to a particular dialect, the second adapter group 120b may perform a more complex adaptation to suppress background noise (e.g., sounds having different frequency and/or periodicity of the speech of interest), the third adapter group 120c may perform yet more complex adaptation for to suppress background speech (e.g., which may have frequency and/or periodicity close to the speech of interest), etc.

Adapter selection within an adapter group may be performed by a router 130. Routing may be analogous to self-attention in certain neural network architectures (e.g., transformer and conformer architectures); however, routing may require less computation and/or introduce less latency. In some implementations, a router 130 may be a classifier that assigns the input data 105 to one or more categories (e.g., selects one or more adapters 125). For example, a router 130 may be a neural network (e.g., a simple CNN or transformer) having a dense layer followed by a non-linear activation function, a projection layer, and a softmax. In general, a fast (e.g., computationally inexpensive) router 130 may be preferable to a sophisticated one. In some implementations, the input data 105 may be processed by the adapter 125 corresponding to the 1-best category determined by the router 130. For example, FIG. 1 illustrates a routing selection in which the first router 130a selects the adapter 125a-1, the second router 130b selects the adapter 125b-0, and the third router 130c selects the adapter 125c-0. In some implementations, the $0^{th}$ adapter (e.g., adapters labeled 125_-0) may correspond to a null transformation that outputs zero regardless of the value(s) of the input data 105. In some implementations, the input data 105 may be processed by the adapters 125 corresponding to the n-best (e.g., two or three) categories determined by the router 130. In some implementations, the output of the softmax (e.g., probabilities, corresponding to respective adapters 125, summing to 1) may be used to weight the output of the n-best selected adapters 125. For example, the 1-best adapter 125 may correspond to a softmax output of 0.6, the second-best adapter 125 may correspond to a softmax output of 0.25, and the third-best adapter 125 may correspond to an output of 0.01. Accordingly the outputs of those adapters 125 may be weighted (multiplied) by the corresponding softmax output and summed to generate the output of that adapter group 120. Adapter selection by the routers 130 can be configured through training, as described further below.

A router 130 may process the input data 105 and select one or more adapters 125 of the adapter group 120 to process the input data 105 (e.g., by performing transformation). For example, the first router 130a may select one or more adapters 125a of the first adapter group 120a to process the input data 105; the second router 130b may select one or more adapters 125b of the second adapter group 120b to process the input data 105; and the third router 130c may select one or more adapters 125c of the third adapter group 120c to process the input data 105; etc. In each case, a router 130 may select a null/identity adapter 125 (e.g., one of the adapters 125a-0, 125b-0, 125c-0, etc.) or one of the non-null/non-identity adapters 125 to process the input data 105. Collectively, the routers 130 may select one non-null/non-identity adapter 125 from one adapter group 120 to process the input data 105, while selecting the null/identity adapter 125 in the other adapter groups 120. In some cases, however, the routers 130 may select more than one non-null/non-identity adapter 125 in one adapter group 120, and/or select more than one non-null/non-identity adapter 125 in multiple adapter groups 120. Continuing the ASR use case example above, the first router 130a may be trained to detect features in the input data 105 representing less complex adaptations (e.g., recognizing or detecting characteristics of a particular dialect), the second router 130b may be trained to detect features representing more complex adaptations (e.g., background noise), the third router may be trained to detect features representing yet more complex adaptations (e.g., background speech). Thus, the sequence of adapter groups 120 may represent an escalation of complexity in terms of adapting the input data 105 for a certain purpose such as introducing a correction to improve the accuracy of downstream processes.

In some implementations, adapter selection by a router 130 may take into account signals besides the input data 105; for example, context/history data 135. In some implementations, routing selection of an adapter layer 100 may converge after receiving some amount of input data (e.g., a second or several seconds of audio data and/or video data, etc.). For example, if the adapter layer 100 makes a routing decision based on a dialect determined after processing a few seconds of audio data; thus it may be unnecessary to change the routing decision while processing additional audio data from the same utterance or dialog. In some implementations, an adapter layer 100 may persist previous routing decisions (e.g., based on dialect or background noise conditions) for a limited time and/or until receiving a reset signal indicating an end of a segment of input data (e.g., an ASR endpoint) or a beginning of a new segment of input data (e.g., detection of a wakeword as may be used to activate a voice-controlled device or system). For example, if the adapter later 100 is processing acoustic feature data for ASR, the dialect of the speech and/or acoustic environment may not be expected to change; thus, routing may not need to be applied continually, and computations/latency can be preserved. In some implementations, multiple adapter layers 100 may be introduced into a machine learning component; for example, after multiple blocks of a conformer used for ASR. Because the multiple adapter layers 100 may be adapting the machine learning component for the same characteristics of the input data 105 (e.g., dialect, background noise, pixilation or color skewing in video data, slant of handwriting, etc.), routing decisions need not be repeated at each stage. Rather, a first adapter layer 100a may include routers 130, while successive adapter layers 100b, etc., include no routers 130 or simplified routers that simply route data to the adapters 125 corresponding to the adapters 125 selected in the first or previous adapter layer 100 as conveyed via the context/history data 135. In some implementations, routers 130 may select adapters 125 based on other context data 135 such as a user profile or speaker identifier. That is, if the adapter layer 100 has information about characteristics of the input speech, it can select adapters 125 based in part on that information.

The routers 130 and adapters 125 may be trained separately or together. For example, when trained separately, a router 130 may be trained to classify input data 105 into one or more categories based on, for example, an annotated dataset. An adapter 125 may be trained to transform input data 105 corresponding to a particular category to, for example, move a centroid of a cluster corresponding to that category in a manner that makes the output data better suited for processing by downstream components (e.g., subsequent blocks or layers of a machine learning component into which the adapter layer is inserted, or another machine learning component). The categories used for training the router 130 may correspond to identifiable characteristics.

For example, in the example of ASR processing, categories may be set to correspond to different dialects (e.g., Scottish, Welsh, American, British, and/or international variants of English, etc.), different categories of background noise (e.g., different signal-to-noise ratios and/or different frequency distributions of background noise, etc.). In some implementations, however, routers 130 and adapters 125 may be trained together to "learn" categories that may be more useful to the adapter layer 100 in terms of better adapting the input data 105 for subsequent processing, but which may not have a one-to-one correspondence with an identifiable characteristic of the input data. When an adapter layer 100 is trained in this manner—e.g., using a variant of gradient descent to improve the accuracy of subsequent inferences-individual adapters 125 may learn to specialize on clusters corresponding to router 130 classifications, while the routers 130 may learn to select adapters 125 best configured to transform data corresponding to the router classification.

Training of the routers 130 and/or the adapters 125 may include adjusting parameters and/or values by a process or processes of gradient descent. For example, a training dataset may include training data and corresponding labels (e.g., a ground truth). A machine learning component having one or more adapter layers 100 inserted therein may process the training data, and the output of the machine learning component may be compared to the label corresponding to the training data. For example, audio training data may be processed and the ASR output data may be compared to a human transcript of speech represented therein. In another example, image data may be processed and the resulting image feature data and/or object class data may be compared to human-generated annotations. One or more loss function may be calculated using the output and the label(s). Based on the results of the loss function(s), router 130 parameters may be updated to improve the router's classification of input data into various categories, and/or adapter 125 transformation values (e.g., matrix elements and/or neural network weights) corresponding to a particular category may be updated to improve the accuracy of downstream processing of the transformed data. For example, parameters of a router 130 may be updated to improve classification of audio input data into categories corresponding to dialect. Transformation values of an adapter 125 corresponding to a particular category (e.g., dialect) may be updated to improve recognition of speech corresponding to that category. However, and as described previously, the categories need not correspond one-to-one with an identifiable characteristic of the input data. Nor do the extents of categories in an embedding space (e.g., boundaries between clusters) need to remain static during training. Rather, neither cluster boundaries (e.g., as determined by routers 130) nor cluster centroid adjustments (e.g., as performed by adapters 125) need remain static during training.

In some implementations, parameters of the machine learning component itself may be frozen during training such that only the parameters of the routers 130 and/or transformation values of adapters 125 are updated during training. In other implementations, some portion(s) of the machine learning component may be allowed to float during training; for example, a portion of the machine learning component preceding the adapter layer 100 and/or a portion of the machine learning component following the adapter layer 100. This may train the machine learning component(s) to process the transformed data.

In some implementations, the system 400 may be trained in stages. For example, routers 130 may be trained to classify input data 105 into predefined categories. This may include initiating the routers 130 to classify input data 105 into categories based on, for example, dialect and/or SNR. Next, the adapters 125 may be trained to transform input data 105 categorized by the routers. The routers 130 may then be allowed to float to redefine class boundaries based on the performance of different adapters 125 in adapting input data 105 corresponding to those categories. Then both the routers 130 and adapters 125 may be allowed to float. In some implementations, only certain adapters 125 (e.g., corresponding to categories related to dialect or SNR) to float during a given training stage, before being frozen while other adapters 125 are allowed to float. Category boundaries and transformations may drift over time as performance of the machine learning component and adapter layer(s) 100 improve.

In some implementations, individual adapters 125 may be trained to address a particular characteristic of the input data 105. For example, a first adapter 125a-1 may be trained to transform audio feature data corresponding to a particular dialect to improve ASR, while a second adapter 125a-2 is trained for a different dialect. In another example, a third adapter 125b-1 may be trained for a higher speaking pitch ($f_0$) while a fourth adapter 125b-2 is trained for a lower speaking pitch. In yet another example, a fifth adapter 125c-1 may be trained for a faster than normal speaking rate while a sixth adapter 125c-2 is trained for a slower than normal speaking rate. Other conditions/categories may be used, such as different levels and/or qualities of background noise, higher or lower audio quality (e.g., bandwidth, dynamic range, and/or sampling rate) etc. Similarly, the routers 130 may be trained In some implementations, the adapter layer 100 may be trained such that input data 105 is only transformed some fraction of the time. For example, adapter layer 100 may be trained that roughly half (or some other proportion) of input data 105 results in selection of only null transformations or identity transformations. Such null/identity transformations may result in little additional computation and/or latency over the routing decisions themselves as zero or identity transformations may be computationally trivial (e.g., outputting zero from an adapter group 120 or passing untransformed input data 105). Thus, the routers 130 may be trained to select non-null/non-identity transformations for only a portion of possible input data 105 that is expected to result in subsequent processing having outcomes in a bottom range of outcomes. Hyperparameters for training may be tuned to define conditions for which a router 130 and adapter group 120 should apply a non-null/non-identity transformation to the input data 105 (e.g., if the untransformed data fails to satisfy an accuracy and/or confidence value condition).

In some implementations, this manner of selective adaptation may be applied recursively using adapter groups 120 of increasing complexity. For example, the data used to train one or more adapters 125 can be sequenced according to a curriculum. Thus a specific adapter 125 can be provided balanced or oversampled classes to ensure it learns the target task, e.g. dialect or background noise. Alternatively, in analogy to boosting, we can sequentially train adapter groups 120 containing adapters 125 of increasing complexity, where training data weights or selection are adjusted to focus on the samples for which the output fails to satisfy a condition (e.g., yielding results that remain low-confidence and/or have high error rate after each adapter set 125 is trained and frozen).

In an example training curriculum, for a first subset of training data for which the output data 115 based on non-null/non-identity transformation by the first router 130a and adapter group 120a fails to satisfy an accuracy and/or confidence condition, the second router 130b and adapter group 120b may be trained to perform more complex transformations (e.g., using more neural network layers/nodes and/or less sparse matrices). During training of the second router 130b and adapter group 120, the first router 130a and adapter group 120a may be frozen (e.g., parameters not updated during that portion of the training). Similarly, for a second subset of training data for which the output data 115 based on non-null/non-identity transformation by the first router 130a and adapter group 120a and the second router 130b and adapter group 120b fails to satisfy an accuracy and/or confidence condition, the third router 130c and adapter group 120c may be trained to perform yet more complex transformations while the first and second router 130a/130b and adapter groups 120a/120b are frozen, and so on. As a result, the routers 130 may be trained to act as classifiers in a decision-tree format, thereby configuring the adapter layer 100 to engage in adaptation of escalating complexity for input data 105 expected to benefit from more complex transformations.

Figure 2A:
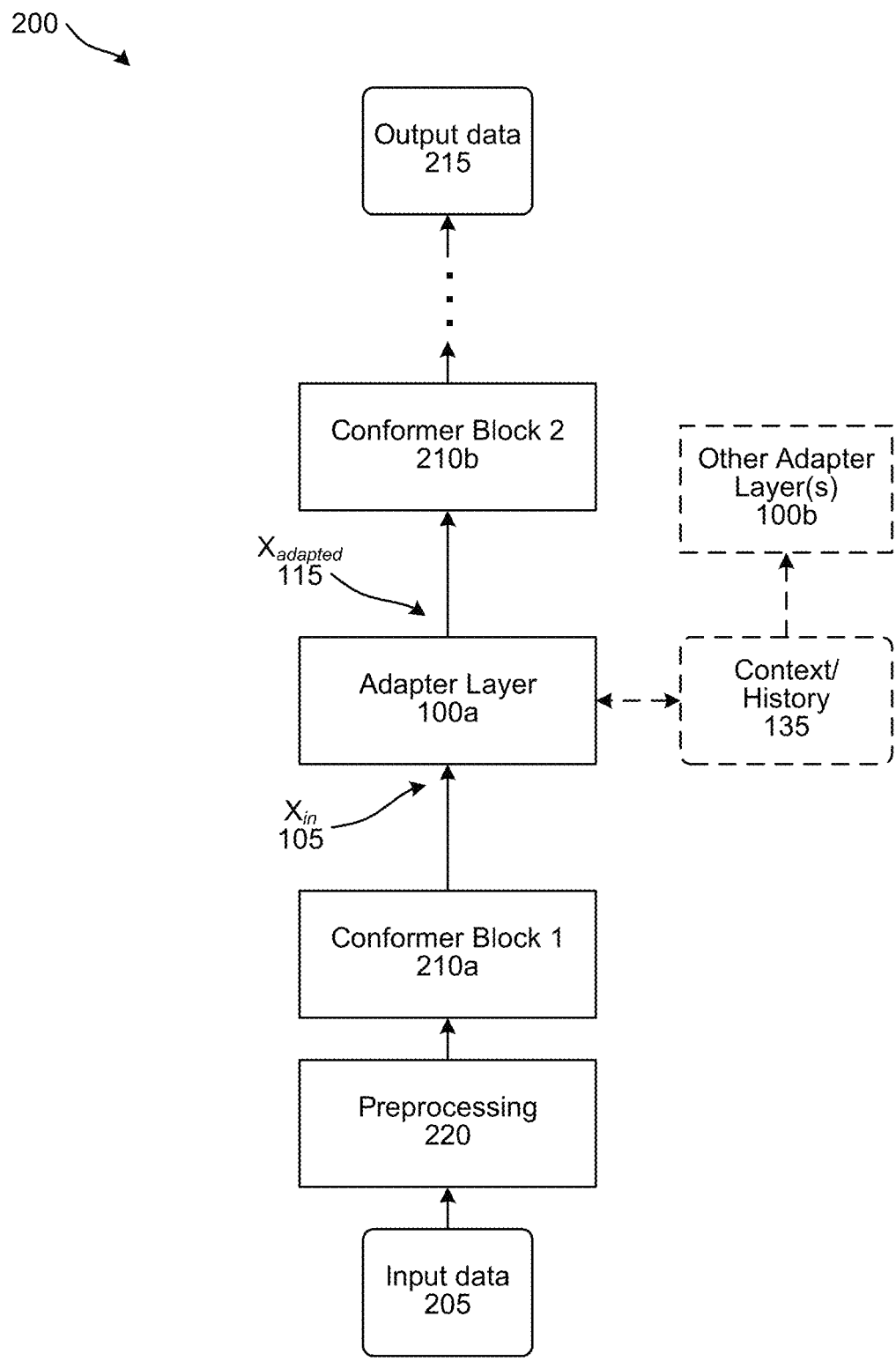
FIG. 2A is a conceptual diagram illustrating a first example configuration of a conformer neural network with an adapter layer inserted between conformer blocks, according to embodiments of the present disclosure.

Adapter layers 100 as described above may be inserted within, or between, various machine learning components as applied to various machine learning tasks related to audio processing, imaging processing, or processing of other kinds of sequential or instantaneous data. FIG. 2A is a conceptual diagram illustrating a first example configuration of a conformer neural network ("conformer") 200 with a first adapter layer 100a inserted between conformer blocks 210a, 210b, etc. (collectively "conformer blocks 210"), according to embodiments of the present disclosure. A conformer is a type of complex machine learning model that has proven useful for performing speech recognition. The conformer 200 may receive input data 205; for example, in the form of spectrograms (e.g., filterbank coefficients) representing frames of audio data. The conformer 200 may process the input data 205 to generate output data 215; for example, ASR output data (e.g., text data) representing a transcript of speech represented in the input data.

Figure 2B:
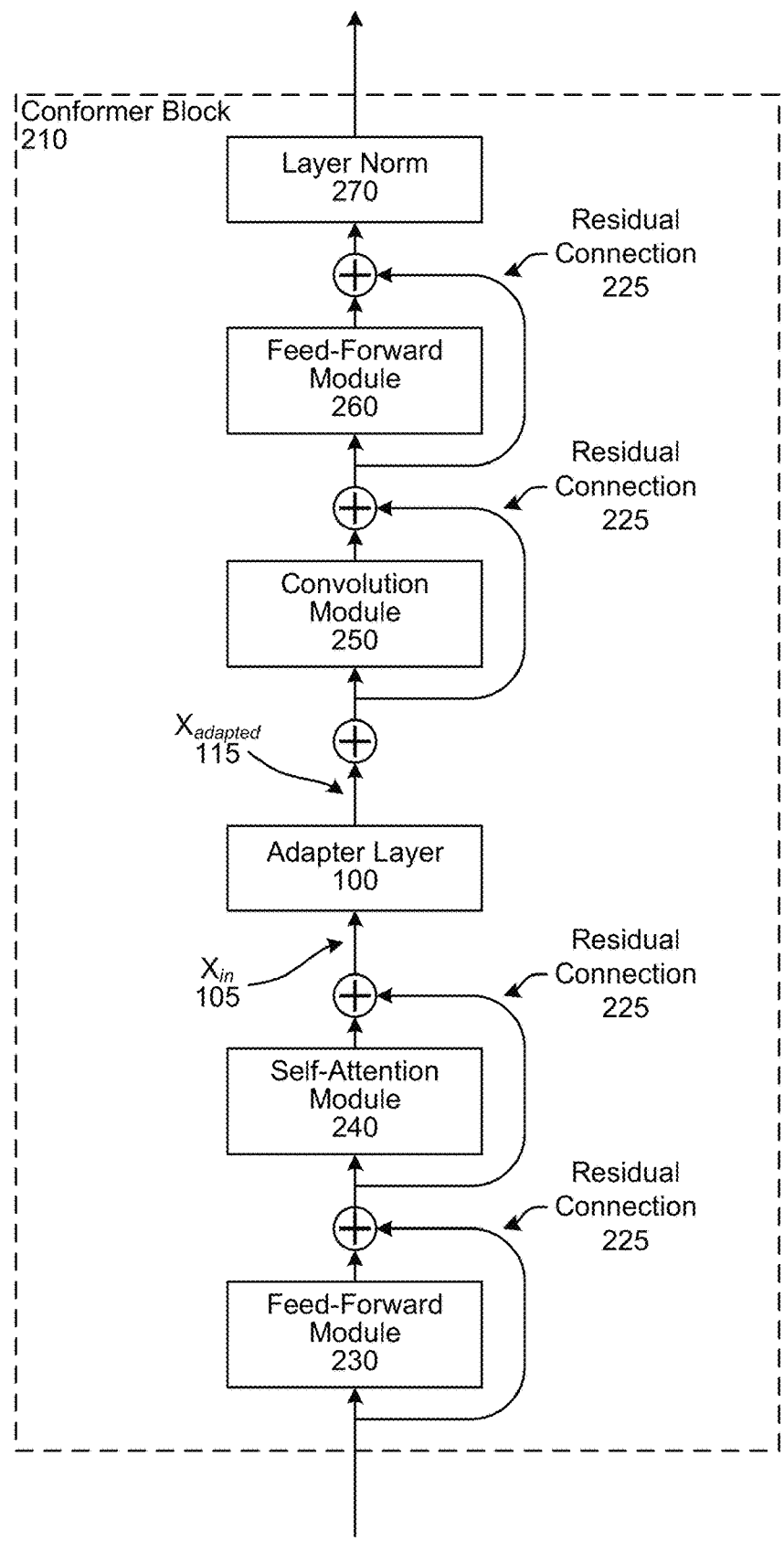
FIG. 2B is a conceptual diagram illustrating a second example configuration of a conformer neural network with an adapter layer between layers within a conformer block, according to embodiments of the present disclosure.

The conformer 200 may include preprocessing components 220. The preprocessing components may include, for example, data augmentation, convolution subsampling, linear transformation, and/or dropout processing to prevent overfitting. The conformer 200 may include one or more conformer blocks 210. An adapter layer 100 may be inserted between the first conformer block 210a and the second conformer block 210b. The adapter layer 100 may receive input data 105 from the first conformer block 210a, and generate output data 115 for input into the second conformer block 210b. Although FIG. 2A illustrates a single adapter layer 100a between the first conformer block 210a and the second conformer block 210b, in various implementations, the conformer 200 may have additional adapter layers 100 before, after, or even within additional conformer blocks 210 (e.g., as illustrated in FIG. 2B). In some implementations, the conformer 200 may include additional adapter layers 100 between conformer blocks 210 number 6 and 7 in a 12-block model. In some implementations, an adapter layer 100 may be inserted after the last conformer block 210 and/or before the first conformer block 210a. In some implementations, the adapter layer 100 may receive other signals upon which to base routing decisions, such as the context/history data 135 as described previously. The context/history data 135 may include, for example, information about routing decisions made for previously received input data 205, information about voice characteristics of a speaker (e.g., from a user profile), information about routing decisions made by an adapter layer 100 positioned at an early stage within the conformer 200, etc. Thus, computations of a second adapter layer 100b may be reduced by leveraging previous routing decisions of the first adapter layer 100a and/or other data to simplify subsequent routing decisions or bypass them altogether.

In some implementations, a conformer 200 may include an encoder and a decoder, each having one or more conformer blocks 210. One or more adapter layers 100 may be added to the encoder portion and/or to the decoder portion. An adapter layer 100 added to the decoder portion may perform different adaptations (e.g., with regard to word choices/predictions) from an adapter layer 100 added to the encoder portion (e.g., transformations related to acoustic features). For example, an adapter layer 100 inserted in a decoder portion of the conformer 200 may be trained to adapt word prediction to different domains (e.g., movies, music, navigation) and/or to different dialect-based word choices (e.g., related to dialect-specific vocabulary including vernacular, slang, etc.). In some implementations, routing selections made in an encoder may be leveraged in the decoder as well. For example, if an adapter layer 100 inserted into an encoder portion of an ASR model makes a routing selection based on dialect, that routing selection may be leveraged by the decoder for performing word selection/prediction corresponding to the same dialect.

In some implementations, the adapter layer 100 may be inserted within a neural network block; that is, between internal layers of a neural network block. FIG. 2B is a conceptual diagram illustrating a second example configuration of a conformer 200 with an adapter layer 100 inserted between layers within a conformer block 210, according to embodiments of the present disclosure. The conformer block 210 may include a first feedforward module 230, a self-attention module 240, a convolution module 250, second feedforward module 260, and a layer normalization component 270. The conformer block 210 may include residual connections 225 bypassing some or all of the module or components. An adapter layer 100 may be inserted between, for example, the self-attention module 240 and the convolution module 250. The adapter layer 100 may receive input data 105 representing the output of the self-attention module 240 and the residual connection bypassing the self-attention module 240. The adapter layer 100 may generate output data 115, and input it into the convolution module 250, and may additionally send it to the second feedforward module 260 via a residual connection 225. In some implementations, the adapter layer 100 may be inserted before the self-attention module 240 or after the convolution module 250. In some implementations, an adapter layer 100 may replace one or both of the first feedforward module 230 and/or the second feedforward module 260. An adapter layer 100 inserted within a conformer block 210 as shown in FIG. 2B may include a normalization component 150 to normalize the input data 105, because the output of the previous module/component may not have been normalized as the output of the conformer block 210 would be (e.g., by the layer normalization component 270). In various implementations, the adapter layer 100 may be inserted between different pairs of modules/components.

Figure 3:
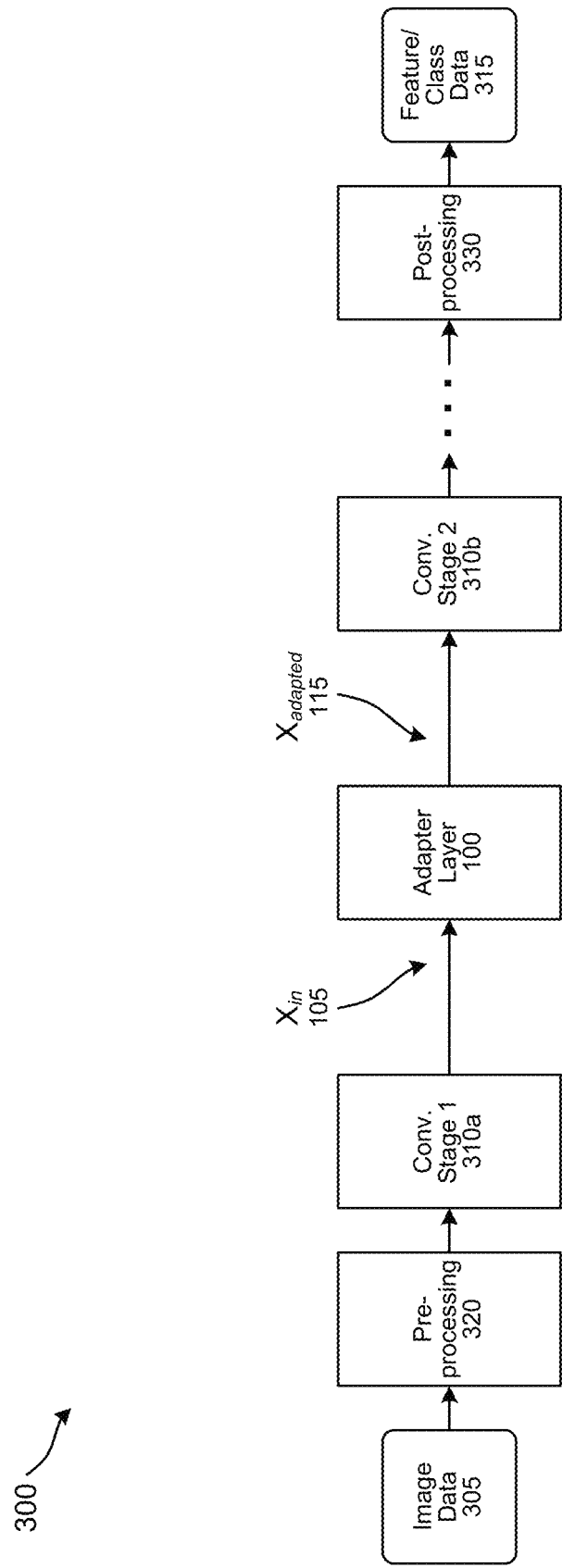
FIG. 3 is a conceptual diagram illustrating an example configuration of a convolutional neural network with an adapter layer between convolution stages, according to embodiments of the present disclosure.

In some implementations, an adapter layer 100 may be used in other types of neural network architectures such as a CNN. FIG. 3 is a conceptual diagram illustrating an example configuration of a CNN 300 with an adapter layer 100 inserted between convolution stages 310, according to embodiments of the present disclosure. The CNN 300 may be configured to perform image processing tasks by receiving image data 305 and outputting feature and/or class data 315. Feature data may include data indicating low level features detected in the image data 305 such as edges, textures, simple shapes, etc. Class data may indicate more complex objects recognized in the image data 305 such as animals, cars, and/or individual faces (e.g., user identification). The CNN 300 may be, for example, an encoder or decoder of a generative model, a residual network (ResNet) configured for object recognition, etc.

The CNN 300 may receive the image data 305 and may perform preprocessing using one or more preprocessing layers 320. In some implementations, the preprocessing layers 320 may include a convolution layer, batch normalization, an activation function such as a ReLU variant, and/or feature pooling such as maximum pooling, etc. The CNN 300 may include one or more convolution stages 310a, 310b, etc. (collectively "convolution stages 310"). In various implementations, the CNN 300 may include more or fewer convolution stages 310. A convolution stage 310 may include one or more neural network convolution layers, batch normalization, and/or ReLU activation, skip connections/residual connections, etc. Although FIG. 3 illustrates a single adapter layer 100 between a first convolutional stage 310a and a second convolutional stage 310b, in various implementations, the CNN 300 may have additional adapter layers 100; for example, before, after, or even within additional convolutional stages 310 (e.g., between convolution layers of a convolution stage 310). The CNN 300 may output feature and/or class data 315 from one or more post-processing layers 330. In some implementations, the post-processing layers 330 may include one or more of a pooling layer (e.g., average pooling, max pooling, etc.), flattening layer (e.g., for flatting a feature map from N×M into a 1×N vector), and/or a fully connected layer (e.g., for producing predictions). The adapter layer 100 architecture may change according to the dimensionality of the input features $X_{in}$ (e.g., whether the input data 105 is a 1×M vector, an N×M vector, etc.).

The adapter layer(s) 100 of the CNN 300 may adapt the image data 305 for various characteristics. For example, an adapter layer 100 of a CNN 300 configured for handwriting recognition may adapt for slant, aspect ratio (e.g., taller/shorter characters), script versus print, and/or markings on the background (e.g., paper or other writing surface) such as wrinkles, visible textures, and/or watermarks. An adapter layer 100 of a CNN 300 configured for object detection may adapt for shadows, white balance (skewed color), low-light conditions, rotation, pixilation caused by compression, and/or flaws in optics (e.g., a scratched or smudged lens), etc. The adapter layer(s) 100 of the CNN 300 may be used to, for example, improve user recognition by compensating for characteristics and/or distortions of image data 305 introduced by, for example, a wide angle lens, camera angle, makeup, and/or facial expression, in addition to the adaptations performed for other types of object recognition.

In various implementations, adapter layers 100 may be inserted into other types of neural network architectures such as recurrent neural network transducers (RNN-Ts), long short-term memory (LSTMs), transformers, etc.

Figure 4:
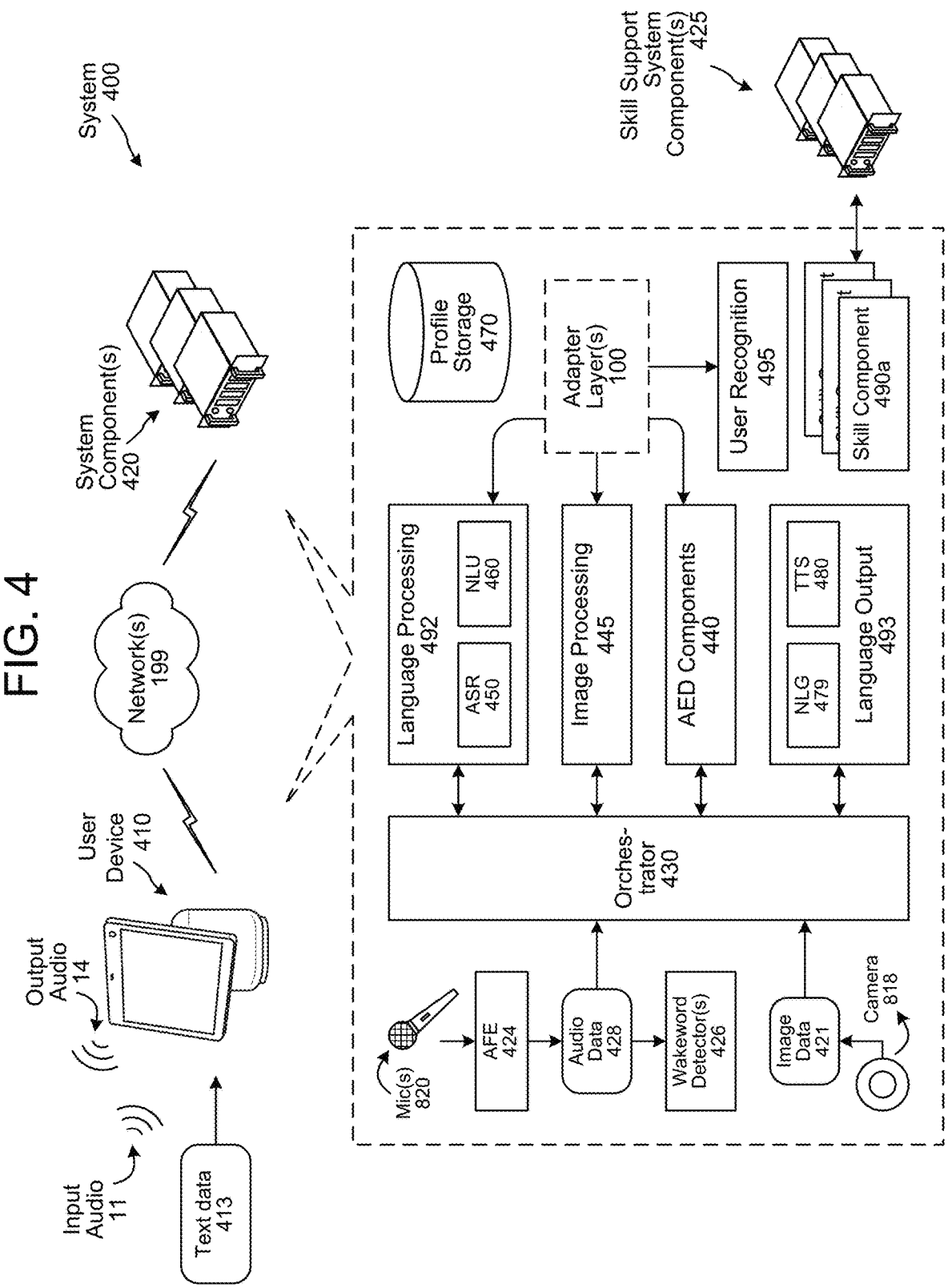
FIG. 4 is a conceptual diagram illustrating additional components of a system including machine learning models customized with adapter layers, according to embodiments of the present disclosure.

FIG. 4 is a conceptual diagram illustrating additional components of a system 400 including machine learning components customized using adapter layers 100, according to embodiments of the present disclosure. The system 400 may include a user device 410, which may be in communication with one or more additional system components 420 and/or skill support system components 425 over one or more computer networks 199. The system 400 may include components and/or features for processing natural language, including processing related to ASR, NLU, NLG, and/or TTS; and for processing image data 421 including processing related to text, object, and/or user recognition. Adapter layers 100 may be used by various components of the system 400 including language processing components 492 (e.g., in a machine learning model of an ASR component 450), an image processing component 445 (e.g., in an image selection, object detection, and or text recognition machine learning model), an AED component 440 (e.g., in an AED encoder machine learning model), and/or a user-recognition component 495. The various machine learning components may implement such algorithms and apply them to various natural language processing (NLP) tasks such as automatic speech recognition (ASR), natural language understanding (NLU), natural Language Generation (NLG), and speech synthesis, also referred to as text-to-speech (TTS). ASR, NLU, NLG, and/or TTS may be combined to create a "virtual assistant" system that a user can interact with by providing natural language inputs (e.g., human speech and/or text) and receiving natural language outputs (e.g., synthesized speech and/or text) from the machine.

Figure 5:
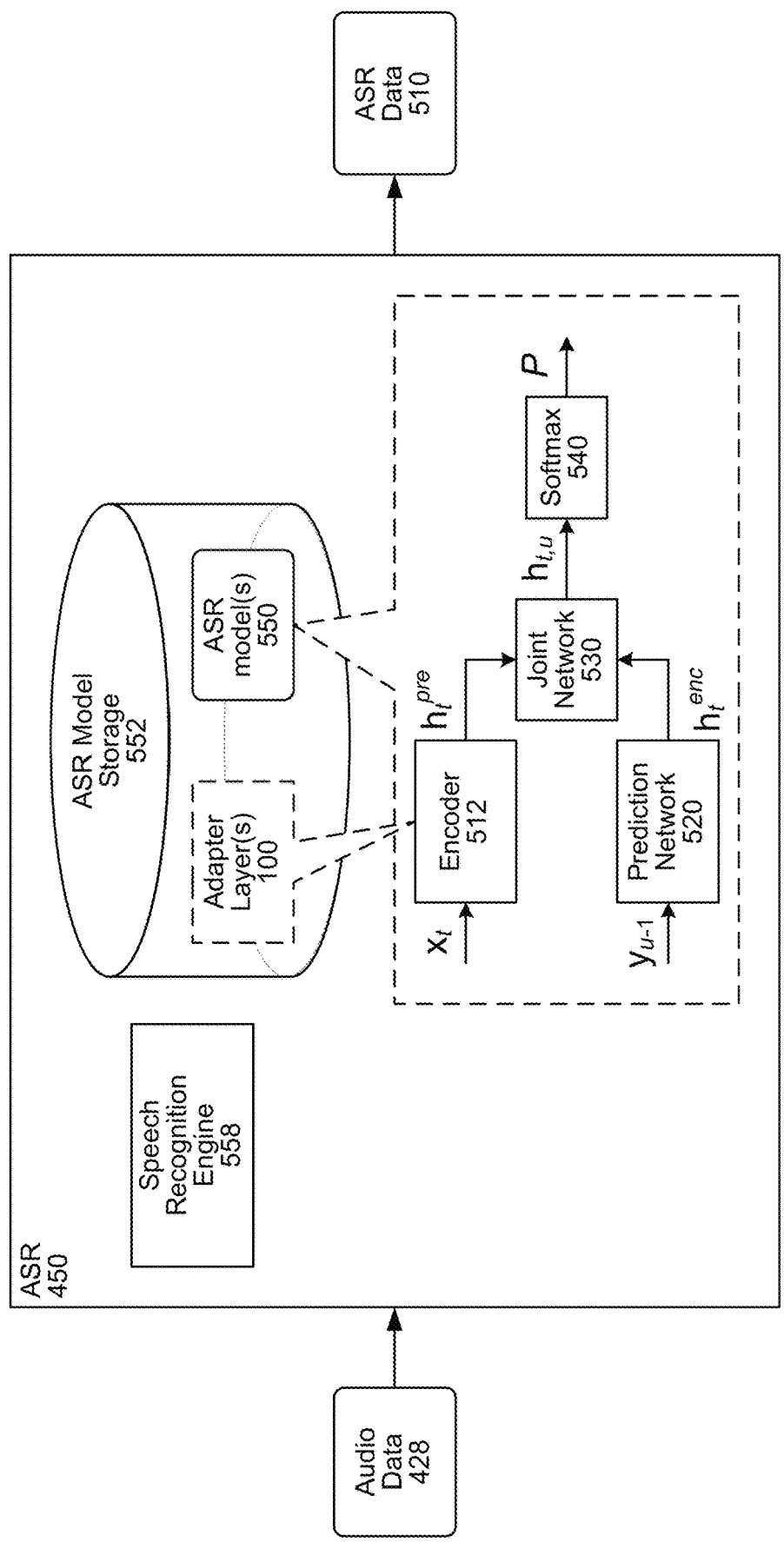
FIG. 5 is a conceptual diagram illustrating an example configuration of an automatic speech resolution component having an adapter layer in a neural network encoder, according to embodiments of the present disclosure.

The system 400 may operate using various components as described in FIG. 5. The various components may be located on same or different physical devices. Communication between various components may occur directly or across a network(s) 199. The device 410 may include audio capture component(s), such as a microphone 820 or array of microphones of a device 410, captures audio 11 and creates corresponding audio data. Once speech is detected in audio data representing the audio 11, the device 410 may determine if the speech is directed at the device 410/system component 420. In at least some embodiments, such determination may be made using a wakeword detection component 426. The wakeword detection component 426 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of device 410. Other input forms may include indication that the user has pressed a physical or virtual button on device 410, the user has made a gesture, etc. The device 410 may also capture images using camera(s) 818 of the device 410 and may send image data 421 representing those image(s) to the system component 420. The image data 421 may include raw image data or image data processed by the device 410 before sending to the system component 420. The image data 421 may be used in various manners by different components of the system to perform operations such as determining whether a user is directing an utterance to the system, interpreting a user command, responding to a user command, etc.

The wakeword detector 426 of the device 410 may process the audio data, representing the audio 11, to determine whether speech is represented therein. The device 410 may use various techniques to determine whether the audio data includes speech. In some examples, the device 410 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 410 may implement a classifier configured to distinguish speech from background noise. The classifier may be implemented by techniques such as linear classifiers, support vector machines, and decision trees. In still other examples, the device 410 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 426 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 426 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 426 and/or input is detected by an input detector, the device 410 may "wake" and begin processing audio data 428, representing the audio 11, and/or transmitting the audio data 428 to a system component 420 for processing. The audio data 428 may include data corresponding to the wakeword; in other embodiments, the portion of the audio corresponding to the wakeword is removed by the device 410 prior to sending the audio data 428 to the system component(s) 420. In the case of touch input detection or gesture based input detection, the audio data may not include a wakeword.

In some implementations, the system 400 may include more than one system component 420. The system components 420 may respond to different wakewords and/or perform different categories of tasks. Each system component 420 may be associated with its own wakeword such that speaking a certain wakeword results in audio data be sent to and processed by a particular system. For example, detection of the wakeword "Alexa" by the wakeword detector 426 may result in sending audio data to system component 420a for processing while detection of the wakeword "Computer" by the wakeword detector may result in sending audio data to system component 420b for processing. The system may have a separate wakeword and system for different skills/ systems (e.g., "Dungeon Master" for a game play skill/ system component 420c) and/or such skills/systems may be coordinated by one or more skill components 490a, 490b, 490c, etc., (collectively "skill component(s) 490") of one or more system components 420.

Upon receipt by the system 400, the audio data 428 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 428 to a language processing components 492. The language processing components 492 (sometimes also referred to as a spoken language understanding (SLU) component) includes an automatic speech recognition (ASR) component 450 and a natural language understanding (NLU) component 460. The ASR component 450 may transcribe the audio data 428 into text data. The text data output by the ASR component 450 represents one or more than one (e.g., in the form of an N-best list) ASR hypotheses representing speech represented in the audio data 428. The ASR component 450 interprets the speech in the audio data 428 based on a similarity between the audio data 428 and pre-established language models. For example, the ASR component 450 may compare the audio data 428 with models for sounds (e.g., acoustic units such as phonemes, senons, phones, etc.) and sequences of sounds to identify words that match the sequence of sounds of the speech represented in the audio data 428. The ASR component 450 sends the text data generated thereby to an NLU component 460, via, in some embodiments, the orchestrator component 430. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein. The ASR component 450 is described in greater detail below with regard to FIG. 5.

The language processing components 492 may further include a NLU component 460. The NLU component 460 may receive the text data from the ASR component. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the device 410, the system component(s) 420, a skill component 490, a skill support system component 425, etc.) to execute the intent. For example, if the text data corresponds to "play the $5^{th}$ Symphony by Beethoven," the NLU component 460 may determine an intent that the system output music and may identify "Beethoven" as an artist/composer and "5th Symphony" as the piece of music to be played. For further example, if the text data corresponds to "what is the weather," the NLU component 460 may determine an intent that the system output weather information associated with a geographic location of the device 410. In another example, if the text data corresponds to "turn off the lights," the NLU component 460 may determine an intent that the system turn off lights associated with the device 410 or the user 5. However, if the NLU component 460 is unable to resolve the entity—for example, because the entity is referred to by anaphora such as "this song" or "my next appointment"—the language processing components 492 may send a decode request to another system component 420 for information regarding the entity mention and/or other context related to the utterance. The language processing components 492 may augment, correct, or base results data upon the audio data 428 as well as any data received from the other system component 420.

The NLU component 460 may return NLU results data (which may include tagged text data, indicators of intent, etc.) back to the orchestrator 430. The orchestrator 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data includes an N-best list of NLU hypotheses, the NLU component 460 and the orchestrator component 430 may direct the top scoring NLU hypothesis to a skill component(s) 490 associated with the top scoring NLU hypothesis. The system 400 may also include a post-NLU ranker which may incorporate other information to rank potential interpretations determined by the NLU component 460.

A skill component may be software running on the system component(s) 420 that is akin to a software application. That is, a skill component 490 may enable the system component(s) 420 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 420 may be configured with more than one skill component 490. For example, a weather service skill component may enable the system component(s) 420 to provide weather information, a car service skill component may enable the system component(s) 420 to book a trip with respect to a taxi or ride sharing service, a restaurant skill component may enable the system component(s) 420 to order a pizza with respect to the restaurant's online ordering system, etc. A skill component 490 may operate in conjunction between the system component(s) 420 and other devices, such as the device 410, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system component(s) 425 may communicate with a skill component(s) 490 within the system component(s) 420 and/or directly with the orchestrator component 430 or with other components. A skill support system component(s) 425 may be configured to perform one or more actions. An ability to perform such action(s) may sometimes be referred to as a "skill." That is, a skill may enable a skill support system component(s) 425 to execute specific functionality in order to provide data or perform some other action requested by a user. For example, a weather service skill may enable a skill support system component(s) 425 to provide weather information to the system component(s) 420, a car service skill may enable a skill support system component(s) 425 to book a trip with respect to a taxi or ride sharing service, an order pizza skill may enable a skill support system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system 400 may be configured with a skill component 490 dedicated to interacting with the skill support system component(s) 425. Unless expressly stated otherwise, reference to a skill, skill device, or skill component may include a skill component 490 operated by the system component(s) 420 and/or skill operated by the skill support system component(s) 425. Moreover, the functionality described herein as a skill or skill may be referred to using many different terms, such as an action, bot, app, or the like. The skill component 490 and or skill support system component(s) 425 may return output data to the orchestrator 430.

The system 400 may include language output components 493. The language output component 493 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data discussed below). Alternatively or in addition, the TTS component 480 may receive text data from a skill component 490 or other system component for output.

The NLG component 479 may include a trained model. The NLG component 479 generates text data (e.g., from dialog data received by the dialog manager) such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 480.

The TTS component 480 may generate audio data (e.g., synthesized speech) from text data using one or more different methods. Text data input to the TTS component 480 may come from a skill component 490, the orchestrator component 430, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The system 400 may include an AED component 440. Acoustic Event Detection (AED), as referred to herein, includes a use of computer science, such as artificial intelligence, that relates to processing audio data representing a sound, such as a non-speech sound, to determine when and if a particular acoustic event is represented in the audio data. An AED component 440 may be used as, for example, a part of a smart home system or an alarm system that may detect and possibly take one or more actions in response to detecting a representation of an acoustic event in audio data 428. An AED component 440 may be configured to detect and act upon different types of acoustic events. An acoustic event may be an event identified in the presence of an acoustic background (e.g., background noise) represented in audio data; for example, and without limitation, a door opening, a doorbell ringing, breaking glass, footsteps, a baby crying, a smoke alarm, etc. Such acoustic events may be distinguished from uneventful background noise such as wind, traffic, HVAC equipment, etc. The AED component 440 may respond to a detected event by turning on a light, adjusting environmental settings, triggering an alarm, sending a notification to a user, recording video using a camera, etc. The AED component 440 may include one or more machine learning components configured to process the audio data 428. The machine learning component(s) may implement one or more adapter layers 100 to suppress acoustic features related to uneventful background noise and/or enhance acoustic features related to events of interest. AED and event notification is described further below with reference to FIG. 6.

The device 410 may include still image and/or video capture components such as a camera or cameras 818 to capture one or more images. The device 410 may include circuitry for digitizing the images and/or video for transmission to the system component(s) 420 as image data. The device 410 may further include circuitry for voice command-based control of the camera, allowing a user to request capture of image or video data. The device 410 may process the commands locally or send audio data 428 representing the commands to the system component(s) 420 for processing, after which the system component(s) 420 may return output data that can cause the device 410 to engage its camera.

Upon receipt by the system component(s) 420, the image data 421 may be sent to an orchestrator component 430. The orchestrator component 430 may send the image data 421 to an image processing component 445. The image processing component 445 can perform computer vision functions such as object recognition, modeling, reconstruction, etc. For example, the image processing component 445 may detect a person, face, etc. (which may then be identified using user-recognition component 495).

In some implementations, the image processing component 445 can detect the presence of text in an image. In such implementations, the image processing component 445 can recognize the presence of text, convert the image data to text data, and send the resulting text data via the orchestrator component 430 to the language processing components 492 for processing by the NLU component 460. The image processing component 445 may include one or more machine learning components configured to process the image data 421. The image processing machine learning components may implement adapter layers 100 to improve text, object, and/or user recognition. The image processing component 445 is described in additional detail below with reference to FIG. 7.

The system 400 may include a user-recognition component 495 that recognizes one or more users using a variety of data. The user-recognition component 495 may take as input the audio data 428 and/or text data output by the ASR component 450. The user-recognition component 495 may perform user recognition by comparing audio characteristics in the audio data 428 to stored audio characteristics of users. The user-recognition component 495 may also perform user recognition by comparing biometric data (e.g., fingerprint data, iris data, etc.), received by the system in correlation with the present user input, to stored biometric data of users assuming user permission and previous authorization. The user-recognition component 495 may further perform user recognition by comparing image data 421 (e.g., including a representation of at least a feature of a user), received by the system in correlation with the present user input, with stored image data including representations of features of different users. The user-recognition component 495 may perform additional user recognition processes, including those known in the art. The user-recognition component 495 may include one or more machine learning models configured to process audio data 428 and/or image data 421. The machine learning components of the user-recognition components 495 may include adapter layers 100 to adapt the audio and/or image data to suppress and/or enhance certain characteristics and improve recognition.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The system 400 (either on device 410, system component 420, or a combination thereof) may include profile storage 470 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device;

internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 410, the user profile (associated with the presented login information) may be updated to include information about the device 410, for example with an indication that the device is currently in use. Each user profile may include identifiers of skills that the user has enabled. When a user enables a skill, the user is providing the system component 420 with permission to allow the skill to execute with respect to the user's natural language user inputs. If a user does not enable a skill, the system component 420 may not invoke the skill to execute with respect to the user's natural language user inputs.

The profile storage 470 may act as a storage for profile-specific adapter layer data, such as adapter layers 100 trained and/or configured for a particular user's voice and/or speech characteristics. The adapter layers 100 may be trained and/or configured for user device-specific characteristics, such as features related to audio capture and processing (e.g., for which an adapter layer 100 can adapt to improve ASR, AED, etc.), image capture and processing (e.g., for which an adapter layer 100 can improve text, object, and/or user recognition, etc.). In some implementations, the profile storage 470 can associate adapter layer data with a user profile, device profile, and/or a group profile, etc. For example, some adapter layer data (such as is used for adapting for signal to noise or different microphone configurations) may be applicable for multiple customers. Some adapter data may be speaker-specific. Different adapter layer, whether applicable globally, by device, and/or by customer ID may be stored in and loaded from the profile storage 470 on the user device 410 and/or retrieved from a system component 420. The adapter layer data may be implemented dynamically depending on context such as based on user recognition and/or real-time or near real-time determinations of the acoustic environment of the user device 410.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 5 is a conceptual diagram illustrating an example configuration of an ASR component 450 having one or more adapter layers 100 in a neural network encoder 512, according to embodiments of the present disclosure. In some implementations, the ASR component 450 may additionally or alternatively include one or more adapter layers 100 in the prediction network 520 (e.g., to make domain- and/or dialect-specific word predictions). In some implementations, the encoder 512 and/or prediction network 520 may be or include a conformer neural network of the type previously described. The adapter layer(s) 100 may be used to customize the encoder 512 and/or prediction network 520 to improve transcription of audio data under different conditions including, for example, speech from different users having different voice and/or speaking characteristics, higher or lower audio quality, higher or lower background noise, different speaking accents/dialects, whispering or yelling, etc. As a result, a single ASR model 550 may be customized (e.g., personalized) for different users/speakers by using one or more different adapter layer(s) 100. For example, one or more adapter layer(s) 100 may correspond to a particular user identifier, speaker identifier, group identifier, etc. The ASR component 450 may recognize the user/speaker, retrieve corresponding adapter layers 100, and process the speech. Personalization using adapter layers 100 as described in here may improve the accuracy of an ASR model 550 over a range of voice/speech characteristics in a manner less costly in terms of size, computation, and/or latency than simply growing the ASR model 550 itself to cover all possible voice/speech characteristics. In some implementations, the adapter layers 100 used in the ASR component 450 may adapt for more complex and/or difficult conditions including stuttering, children's voices, pauses, self-corrections, false starts, and/or mispronunciations, etc.

While ASR models 550 have grown to accurately handle a wider range of inputs (e.g., a large array of language variants) and map them to the right words, such models may outstrip the ability of a user device 410 to store, execute, and even receive periodic updates for them. In addition, it may be difficult to accumulate enough data to cover every possible variant of language and/or acoustic conditions. Thus, introducing an adapter layer 100 to customize an ASR model 550 for particular characteristics of the speech and/or acoustic environment may improve the performance of the ASR component 450 in terms of generating accurate transcriptions of speech represented in the audio data 428 without drastically increasing the size and/or latency attributable to the ASR model 550. In some cases where latency is increased by use of adapter layers 100, a user may forgive the extra latency in return for improved accuracy if they are aware that the system 400 finds their speech challenging to process. In some implementations, the adapter layers 100 may share and/or persist routing selections to reduce routing computations. In some implementations, the adapter layers 100 may base routing decisions on other context/history data; for example, based on user recognition and/or a user or device profile associated with the input audio data 428.

In some implementations, routing decisions made in the context of ASR (e.g., by routers 130 of adapter layers 100 in an ASR model 550) can be leveraged elsewhere in the system 400. For example, routing data may be recorded in, combined with, and/or otherwise associated with the ASR data 510. Dialect, speaker pitch, domain cluster, etc. may be used by used to select different adapter transformations and/or output for use by downstream processes including NLU, entity resolution, and certain skills. In some cases, the system 400 may, based on the routing information, interact with the user to improve the quality of input. For example, if the routing information indicates a maximum adaptation to SNR yet the speech recognition engine 558 determines intelligibility is low, the system 400 may output (e.g., using NLG and/or TTS) a suggestion to the user to try to reduce background noise and repeat a command.

In some implementations, the ASR component 450 may process the audio data 428 using the ASR model 550. The ASR model 550 may be, for example, a recurrent neural network such as a conformer or an RNN-T. An example ASR model 550 architecture is illustrated in FIG. 5. The ASR model 550 may predict a probability (y|x) of labels $y=(y_1, \ldots, y_u)$ given acoustic features $x=(x_1, \ldots, x_t)$. During inference, the ASR model 550 can generate an N-best list using, for example, a beam search decoding algorithm. The ASR model 550 may include an encoder 512, a prediction network 520, a joint network 530, and a softmax 540. The encoder 512 may be similar or analogous to an acoustic model (e.g., similar to an acoustic model), and may process a sequence of acoustic input features to generate encoded hidden representations. The prediction network 520 may be similar or analogous to a language model (e.g., similar to a language model), and may process the previous output label predictions, and map them to corresponding hidden representations. The joint network 530 may be, for example, a feedforward neural network (NN) that may process hidden representations from both the encoder 512 and prediction network 520, and predict output label probabilities. The softmax 540 may be a function implemented (e.g., as a layer of the joint network 530) to normalize the predicted output probabilities.

The ASR component 450 may include a speech recognition engine 558 that may process the audio data 428 with reference to information stored in the ASR model storage 552. In some cases, feature vectors of the audio data 428 may arrive at the system 400 encoded, in which case they may be decoded prior to processing by the speech recognition engine 558. The ASR component 450 may process the audio data 428 and generate ASR data 510 representing an ASR hypothesis, or a possible transcription of speech in the audio data 428. When the ASR component 450 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on, or relate to, a number of factors including, for example, the similarity of the sound in the spoken natural language input to models for language sounds, and/or the likelihood that a particular word, which matches the sounds, would be included in the sentence at the specific location. Based on the considered factors and the assigned confidence score, the ASR component 450 may output ASR data 510 representing an ASR hypothesis that most likely matches the spoken natural language input, or multiple ASR hypotheses in the form of a lattice or an N-best list, with each ASR hypothesis corresponding to a respective score.

Figure 6:
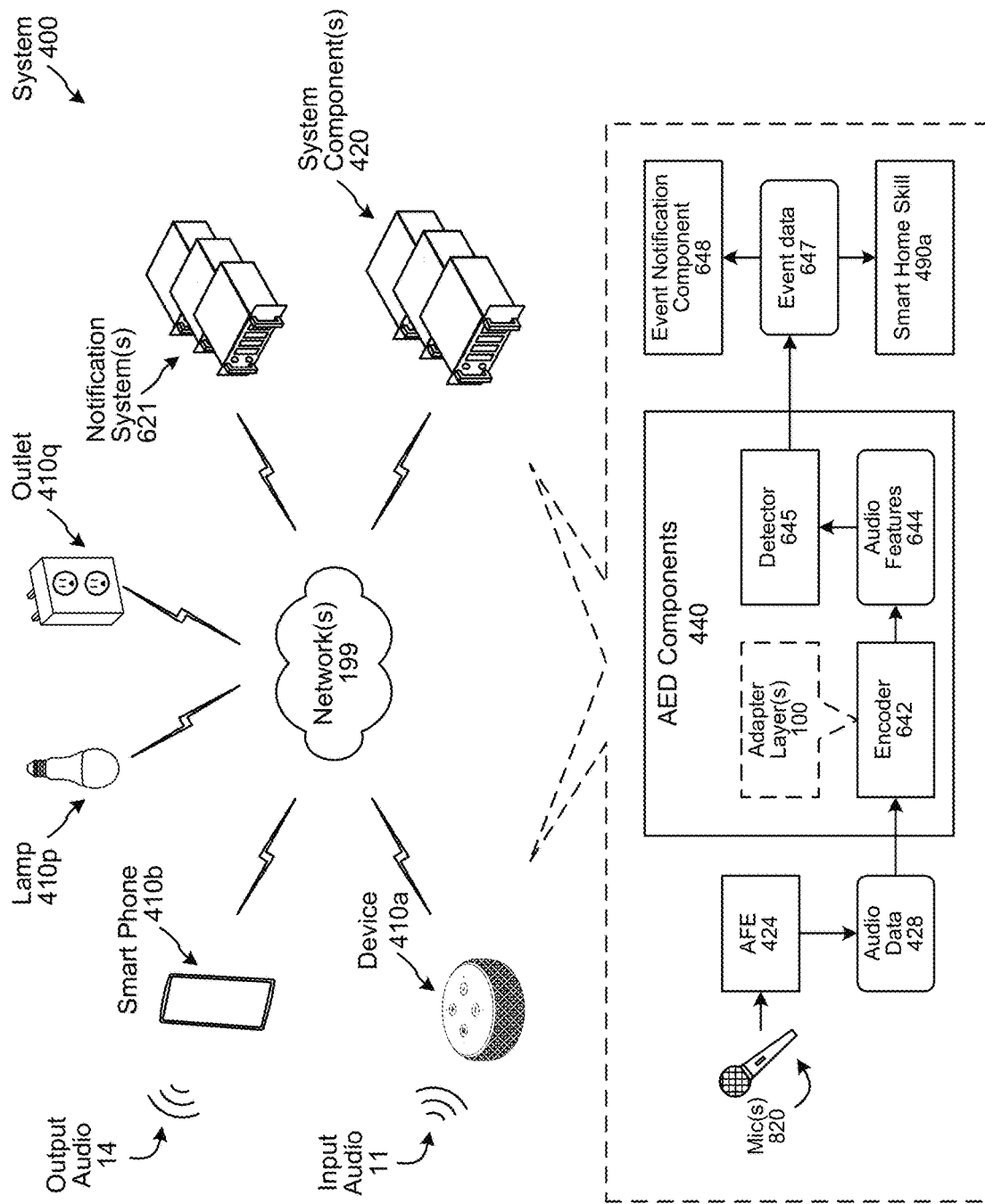
FIG. 6 is a conceptual diagram illustrating an example configuration of an acoustic event detection component having an adapter layer in a neural network encoder, according to embodiments of the present disclosure.

FIG. 6 is a conceptual diagram illustrating an example configuration of the system 400 showing the AED component 440 having an adapter layer 100 in a neural network encoder 642, according to embodiments of the present disclosure. The system 400 as shown in FIG. 6 may be configured as, for example, an AED system in a smart home environment. The adapter layer(s) 100 may be used to customize the encoder 642 to improve event detection in audio data generated under different conditions including, for example, higher or lower audio quality, higher or lower signal-to-noise ratio, the presence of non-event sounds in the audio data (e.g., storms/wind, television/radio, human speech, appliances, HVAC), etc. The transformations performed by the adapter layer 100 may adapt the AED component 440 to better detect events in the presence of background noise, which may be unique to the particular smart home environment where the user device 410 is located. For example, background noise in different locations may have different frequencies and/or periodicities. Some locations may have media (e.g., television, music, video games, etc.) playing frequently. Depending on the characteristics of the specific background noise present at the location of the device 410, the adapter layers 100 of the AED component 440 may perform relatively simple transformations (e.g., to suppress background noise having frequencies and/or periodicity much from events of interest) to relatively complex transformations (e.g., to suppress background noise having frequencies and/or periodicity closer to the events of interest). Other transformations may adapt the encoder 642 to suppress or compensate for echoes, room reverberations, and/or damping caused by furniture or other sound-absorbing objects near the device 410.

In an AED system, a device 410 (alone or in conjunction with a second device such as a system component 420) may be configured to process audio data to determine if properties of the audio data correspond to properties associated with an acoustic event. The device may capture audio 11 using one or more microphones 820, and generate corresponding audio data 428. The audio data may include groups of samples, where a frame of audio data is used to represent a corresponding sample for a period of time. The audio data may represent raw audio signals (e.g., a time-domain waveform) and/or a spectrogram (e.g., frequency domain information such as log filterbank energies (LFBE)). An audio feature encoder may process the audio data to extract audio features. An audio feature encoder, such as the encoder 642, may be configured to process the audio data to extract the audio features. The classifier component, such as the detector component 645, may be configured to determine whether the audio features indicate a potential representation of one or more acoustic events. The encoder and/or classifier may include machine learning models (e.g., neural networks), which may benefit from inclusion of an adapter layer.

The system 400 may include a one or more user devices 410, one or more system components 420, and/or one or more notification system(s) 621. The system 400 may additionally include one or many additional devices 410 with smart home functionality, such as a lamp 410p and a power outlet 410q. The system 400 may include an additional user device, such as the smart phone 410b, to which the system 400 may send notifications and/or from which the system 400 may receive commands; for example, to change a physical state or, or otherwise operate, the lamp 410p, the outlet 410q, and/or other smart home devices.

The system 400 may include (e.g., in the devices 410a and/or the system component(s) 420) an AFE 424, AED components 440, an event notification component 648, and/or one or more skill components 490. The components may reside in the user device 410 and/or system component (s) 420 such that various functionality described herein may be performed by user device 410, the system component(s) 420, or may be divided or shared between the two. For example, in some cases, the user device 410 may process audio data locally, whereas in other cases the user device 410 may send audio data to the system component(s) 420 for processing.

The AED components 440 may include an encoder 642 and detector component 645 as previously described. The AED components 440 may process the audio data 428 and generate event data 647 regarding detected events such as glass breaking, a door opening or closing, etc. The event notification component 648 may, in response to receiving the event data 647, send notifications (e.g., to the smart phone 410*b*). For example, the event notification component 648 may generate and/or cause the system 400 to output a notification to a user in response to the detected event represented in the event data 647; for example, to alert the user that the user device 410 has detected an alarm. The event notification component 648 may work in conjunction with one or more notification system(s) 621. In some implementations, the event notification component 648 may be a component of a notification system 621. Although illustrated as a separate system, notification system(s) 621 may be configured within system component(s) 420, user device 410, or otherwise depending on system configuration. For example, event notification component 648 may be configured within the second device/system(s) 420, user device 410, or otherwise. The event notification component 648 may handle sending notifications/commands to other devices upon the occurrence of a detected acoustic event. The event notification component 648 may have access to information/instructions (for example as associated with profile storage 470 or otherwise) that indicate what device(s) are to be notified upon detection of an acoustic event, the preferences associated with those notifications or other information. The event notification component 648 may have access to information/instructions (for example as associated with profile storage 470 or otherwise) that indicate what device(s) are to perform what actions in response to detection of an acoustic event (for example locking a door, turning on/off lights, notifying emergency services, or the like.

The event notification component 648 may include various internal components such as a notification-determination component, a notification-type component, and/or a device-determination component. The notification-determination component may receive one or more of the event data 647 and determine if a notification corresponding to the event(s) should be sent to one or more device(s). The event data 647 may, for example, indicate a first kind of event, such as glass breaking or a baby crying, and the notification-determination component may determine that a corresponding notification should be sent to a user device. The event data 647 may, on the other hand, indicate a second kind of event, such as a dog bark, and the notification-determination component may determine that no notification may be sent. The notification-determination component may make this determination by determining data identifying the event and determining a corresponding user preference (as stored in, for example, the profile storage 470) for receiving notifications corresponding to the event. That is, a user of the user device may have input a preference for receiving a notification corresponding to a particular event, and the notification-determination component may determine to send a notification based on the preference. In some embodiments, the notification-determination component determines whether or not to send a notification based at least in part on the type of the event. For example, if the event corresponds to a potentially dangerous or rare event, such as glass breaking, the notification-determination component may determine to send the notification.

The notification-type component may determine the type of the notification to be sent. Types of notifications may include text messages, emails, phone calls, push notifications, or other such notifications. Like the notification-determination component, the notification-type component may determine the type of the notification based on a user preference stored in the profile storage 470. The notification-type component may similarly determine the type of the notification based on the type of the event, wherein potentially dangerous or rare events may correspond to a first type of notification, such as a phone call, while other types of events may correspond to a second type of notification, such as an email.

A device-determination component may determine which of a potential plurality of user devices should receive the notification(s). In some embodiments, the device-determination component may determine that the notification(s) (e.g., notification data) are to be sent to every device associated with a user account stored in the profile storage 470. In other embodiments, the device-determination component determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The described system 400 may be used to create various acoustic event detection data for different events as detectable by different devices in different locations. For example, for a same acoustic event, the system 400 may prompt the user to walk through audio capture by several different devices (for example one device in the living room, one device in the kitchen, etc.). The system 400 may instruct the user to cause the event and may capture acoustic data from multiple different devices while the event occurs. The system 400 may use this combined information to form one set of AED configuration data that may be used by multiple devices (e.g., jointly trained AED data goes to each device). Alternatively (or in addition) the system 400 may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The described system 400 may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system 400 may create one set of AED configuration data (e.g., trained AED model) for the acoustic event from a first location and another set of AED configuration data (e.g., trained AED model) for the acoustic event from a second location different from the first location. To do so the system 400 may need to go through the training/prompting steps for each location and then may capture respective audio data corresponding to the respective location in order to train the separate AED model(s). The AED model(s) may then be loaded onto a user device 410 which, when it attempts to detect a future event, may operate both AED model(s). Thus if a particular model is used to detect the event, the user device 410 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the user device 410 may output an indication that the event was detected in location A.

In certain configurations, if the user replaces a user device 410 at a particular location, the user may indicate to the system 400 that the new user device 410 will be located at the same location. The system 400 may then send the appropriate AED configuration data (e.g., AED model(s)) to the new user device 410 so the new user device 410 can be configured to recognize the same acoustic events as the older user device 410.

Certain capabilities of the system 400 may be performed by "skills," whose functions may be performed by a skill component 490. A skill component 490 may be software running on or in conjunction with the system 400 that is, or is similar to, a software application. A skill component 490 may enable the system 400 to execute specific functionality in order to provide data or produce some other requested output. One example of a skill component 490 is a smart home skill component 490*a*, which may be configured to send commands to operate smart home devices and/or receive status or diagnostic information from the smart home devices. Some skill components 490 may operate in cooperation with a skill support system component 425, which may be separate and/or distinct from the first user device 410 and/or second device/system component 420. Some skill components 490 may reside on the user device 410 (e.g., "device skills") while other skill components 490 may reside on the system component 420. Performing certain processing and actions on the user device 410 (e.g., without sending audio data off device) may increase privacy and/or security of the user's data.

In an example operation, the system 400 may receive input audio 12, and generate audio data 428 using the AFE 424. The AED components 440 may process the audio data 428 to generate audio feature data 644 and/or event data 647 representing features of the audio data 428 and/or a detected acoustic event. An acoustic event may be an event identified in the presence of an acoustic background. The system 400 may send the event data 647 to an event notification component 648 configured to generate and issue notifications upon detection of certain acoustic events. The system 400 may send the event data 647 to a smart home skill component 490*a*, which may be configured to operate smart home devices based on preset rules and/or learned behaviors.

The smart home skill component 490*a* may receive event data 647 from the AED components 440 and perform configured and/or learned behaviors, such as changing a physical state of a smart home device. For example, the smart home skill component 490*a* may be configured to turn on the lamp 410*p* upon detecting the opening of a door leading to the room containing the lamp 410*p*. The smart home skill component 490*a* may be configured to turn on outdoor lighting based on a disturbance acoustically detected in a yard, and/or activate a security camera or increase a frame rate of the security camera to capture a source of the disturbance. In concert, the event notification component 648 may send a notification to the smart phone 410*b* regarding the detected disturbance. The smart phone 410*b* may issue a push notification, which may be accompanied by output audio 14 such as an alert tone, to alert the user to the disturbance.

Similarly, the smart home skill component 490*a* may control electricity delivery from the outlet 410*q* based on preset rules and/or learned behaviors. For example, the smart home skill component 490*a* may determine to cut power from the outlet 410*q* in response to a sudden surge in current possibly indicating failure of an appliance. Additionally/alternatively, a user may configure the smart home skill component 490*a* to turn on the outlet 410*q* based on detection if an infant crying, so as to activate a music player, white noise generator, light projector, etc., for soothing the baby. The smart home skill component 490*a* may be configured with additional functionality, such as locking/unlocking a pet door in response to a particular dog's bark. The smart home skill component 490*a* may operate additional automated smart home devices such as autonomous or semi-autonomous appliances such as a vacuum cleaner or drone with a camera. For example, the smart home skill component 490*a* may direct such a robot or appliance to a room where an event has been detected (e.g., to vacuum broken glass or obtain video of a disturbance). The smart home skill component 490*a* may additionally be configured to receive NLU output data (e.g., ranked output data from the NLU component 460, as described further below) from a speech processing system and operate, configure, and/or diagnose one or more smart home devices according to user.

Figure 7:
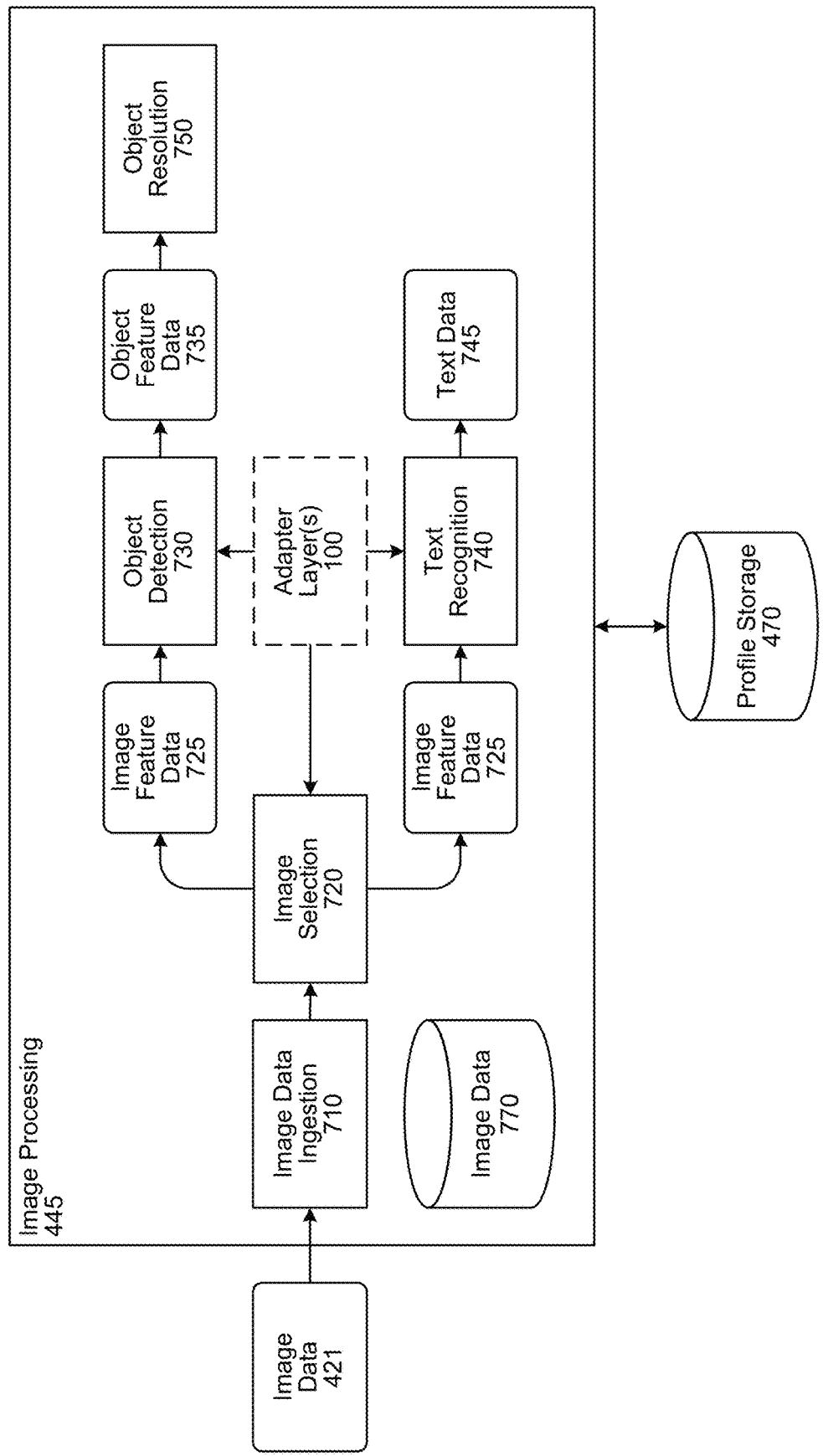
FIG. 7 is a conceptual diagram of components of an image processing component incorporating adapter layers into one or more machine learning models, according to embodiments of the present disclosure.

FIG. 7 is a conceptual diagram of components of an image processing component 445 incorporating adapter layers 100 into one or more machine learning models, according to embodiments of the present disclosure. The adapter layer(s) 100 may be used to customize the various machine learning components to improve image selection, object detection, and/or text recognition. For example, an adapter layer 100 of a machine learning component configured to recognize handwriting may adapt for slant, aspect ratio (e.g., taller/shorter characters), script versus print, and/or markings on the background (e.g., paper or other writing surface) such as wrinkles, visible textures, and/or watermarks. An adapter layer 100 of a machine learning component configured to detect objects may adapt for shadows, white balance (skewed color), low-light conditions, rotation, pixilation caused by compression, and/or flaws in optics (e.g., a scratched or smudged lens), etc. An adapter layer 100 of a machine learning component configured to recognize users may adapt for characteristics and/or distortions of image data 421 introduced by, for example, a wide angle lens, camera angle, makeup, and/or facial expression, in addition to the adaptations performed for other types of object recognition. Some adaptations may involve more complex transformations for others. For example, adapting to handwriting slant may involve a relatively simple transformation of the input data, while adapting to shading or graininess in the image data 421 may involve more complex transformations of the input data. In some implementations, routing (e.g., selection of individual adapters/transformations in the adapter layer 100) may be based on prior routing decisions (e.g., for previous frames of image data 421 in a continuous video input) and/or based on known characteristics of the input data (e.g., information from a device profile related to optics of the device and/or image preprocessing performed by the device).

The system 400 may include image processing component 445. The image processing component 445 may located across different physical and/or virtual machines. The image processing component 445 may receive and analyze image data 421 (which may include single images or a plurality of images such as in a video feed). The image processing component 445 may work with other components of the system 400 to perform various operations. For example the image processing component 445 may work with user-recognition component 495 to assist with user recognition using image data. The image processing component 445 may also include or otherwise be associated with image data storage 770 which may store aspects of image data used by image processing component 445. The image data may be of different formats such as JPEG, GIF, BMP, MPEG, video formats, and the like.

Image matching algorithms, such as those used by image processing component 445, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data storage 770, profile storage 470, or other storage component.

Image selection component 720 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 445 may be configured to select or discard an image quickly so that the system can, in turn, quickly process the selected image and deliver results to a user. The image selection component 720 may select an image for object recognition by computing a metric/feature for each frame in the video feed and selecting an image for processing if the metric exceeds a certain threshold. Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 720 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 720 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection component 720 for sending to another component (e.g., from device to system component 420) and/or for further processing, such as text recognition, object detection/resolution, etc.

The image feature data 725 calculated by image selection component 720 may be sent to other components such as text recognition component 740, object detection component 730, object resolution component 750, etc. so that those components may use the image feature data 725 in their operations. Other preprocessing operations such as masking, binarization, etc. may be performed on image data prior to recognition/resolution operations. Those preprocessing operations may be performed by the user device 410 and/or by the system component(s) 420.

Object detection component 730 may be configured to analyze the image data 421 to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 730 may process at least a portion of the image data 421 and/or image feature data 725 to determine object feature data 735. The object feature data 735 may be indicative of one or more features that are depicted in the image data 421. For example, the features may be face data, or other objects, for example as represented by stored data in profile storage 470. Other examples of features may include shapes of body parts or other such features that identify the presence of a human. Other examples of features may include edges of doors, shadows on the wall, texture on the walls, portions of artwork in the environment, and so forth to identify a space. The object detection component 730 may compare detected features to stored data (e.g., in profile storage 470, image data storage 770, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 730 the system may determine which object is actually seen using object resolution component 750. Thus one component, such as object detection component 730, may detect if an object is represented in an image while another component, object resolution component 750 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 730 may determine that a type of object is represented in image data and object resolution component 750 may then determine which specific object is represented. The object resolution component 750 may also make available specific data about a recognized object to further components so that further operations may be performed with regard to the resolved object.

Object detection component 730 may be configured to process image data to detect a representation of an approximately two-dimensional (2D) object (such as a piece of paper) or a three-dimensional (3D) object (such as a face). Such recognition may be based on available stored data (e.g., 470, 770, etc.) which in turn may have been provided through an image data ingestion process managed by image data ingestion component 710. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

Text recognition component 740 may be configured to analyze the image data 421 to recognize characters text represented in the image data 421 and convert them to text data. Various approaches can be used to attempt to recognize text, as is known or used in the art. For example, various computer vision algorithms can be used to attempt to locate, recognize, and/or identify various characters in an image or video sequence. Computer vision algorithms can utilize various different approaches, as may include edge matching, edge detection, recognition by parts, gradient matching, histogram comparisons, interpretation trees, and the like. The text recognition component 740 may process at least a portion of the image data 421 and/or image feature data 725 to determine text data 745. The text data 745 may be used to, for example, dictate writing for the visually impaired, perform optical character recognition (OCR) of handwritten documents, transcribe notes to convert them to electronic records, etc.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
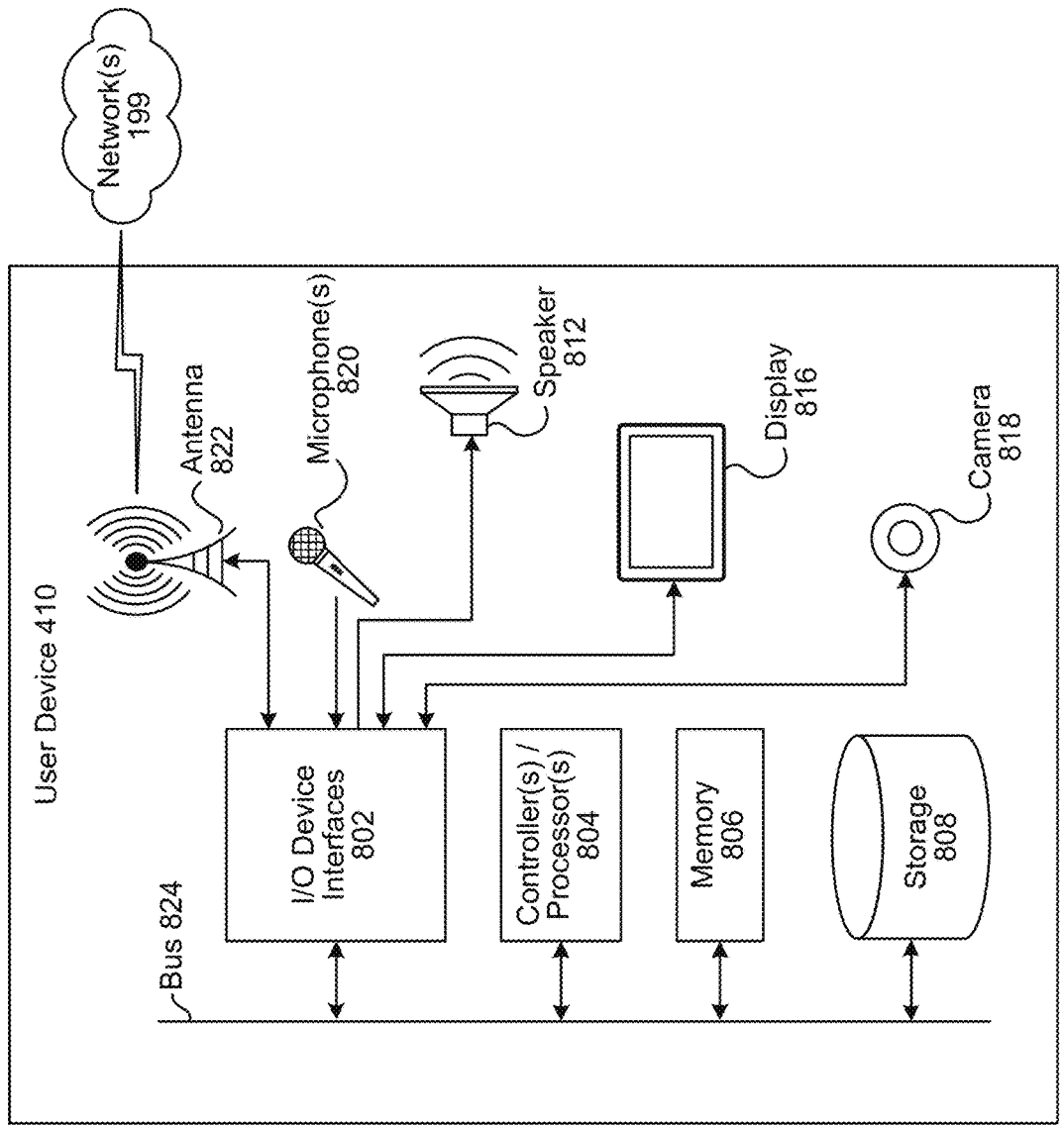
FIG. 8 is a block diagram conceptually illustrating example components of a device, according to embodiments of the present disclosure.
Figure 9:
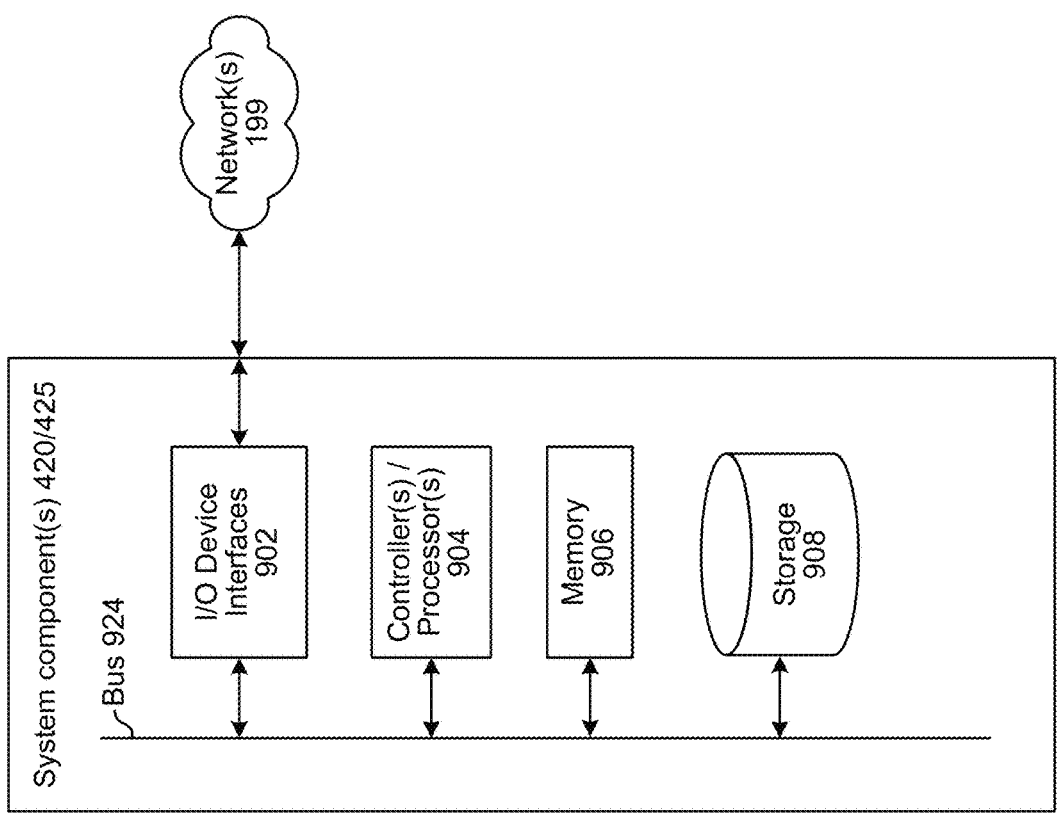
FIG. 9 is a block diagram conceptually illustrating example components of a system, according to embodiments of the present disclosure.

FIG. 8 is a block diagram conceptually illustrating a user devices 410 that may be used with the system. FIG. 9 is a block diagram conceptually illustrating example components of a remote device, such as the natural language command processing system component 420, which may assist with ASR processing, NLU processing, etc., and a skill support system component 425. A system (420/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user devices 410 may operate locally to a user (e.g., within a same environment so the device may receive inputs and playback outputs for the user) the server/system component 420 may be located remotely from the user devices 410 as its operations may not require proximity to the user. The server/system component 420 may be located in an entirely different location from the user devices 410 (for example, as part of a cloud computing system or the like) or may be located in a same environment as the user devices 410 but physically separated therefrom (for example a home server or similar device that resides in a user's home or business but perhaps in a closet, basement, attic, or the like). The supporting device 410 may also be a version of a user devices 410 that includes different (e.g., more) processing capabilities than other user device(s) 410 in a home/office. One benefit to the server/system component 420 being in a user's home/business is that data used to process a command/return a response may be kept within the user's home, thus reducing potential privacy concerns.

Multiple system components (420/425) may be included in the overall system 400 of the present disclosure, such as one or more system components 420 for performing ASR processing, one or more system components 420 for performing NLU processing, one or more skill support system components 425, etc. In operation, each of these systems may include computer-readable and computer-executable instructions that reside on the respective device (420/425), as will be discussed further below.

Each of these devices/components (410/420/425) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device/component (410/420/425) may also include a data storage component (808/908) for storing data and controller/processor-executable instructions. Each data storage component (808/908) may individually include one or more non-volatile storage types such as magnetic storage, optical storage, solid-state storage, etc. Each device/component (410/420/425) may also be connected to removable or external non-volatile memory and/or storage (such as a removable memory card, memory key drive, networked storage, etc.) through respective input/output device interfaces (802/902).

Computer instructions for operating each device/component (410/420/425) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device/component (410/420/425) includes input/output device interfaces (802/902). A variety of components may be connected through the input/output device interfaces (802/902), as will be discussed further below. Additionally, each device/component (410/420/425) may include an address/data bus (824/924) for conveying data among components of the respective device. Each component within a device/component (410/420/425) may also be directly connected to other components in addition to (or instead of) being connected to other components across the bus (824/924).

Referring to FIG. 8, the user devices 410 may include input/output device interfaces 802 that connect to a variety of components such as an audio output component such as a speaker 812, a wired headset or a wireless headset (not illustrated), or other component capable of outputting audio. The user devices 410 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user devices 410 may additionally include a display 816 for displaying content. The user devices 410 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the user device(s) 410, the natural language command processing system component 420, or a skill support system component 425 may include their own dedicated processors, memory, and/or storage. Alternatively, one or more of the components of the user device(s) 410, the natural language command processing system component 420, or a skill support system component 425 may utilize the I/O interfaces (802/902), processor(s) (804/904), memory (806/906), and/or storage (808/908) of the user device(s) 410, natural language command processing system component 420, or the skill support system component 425, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user devices 410, the natural language command processing system component 420, and a skill support system component 425, as described herein, are illustrative, and may be located as a stand-alone device or may be included, in whole or in part, as a component of a larger device or system. As can be appreciated, a number of components may exist either on a system component 420 and/or on user devices 410. Unless expressly noted otherwise, the system version of such components may operate similarly to the device version of such components and thus the description of one version (e.g., the system version or the local version) applies to the description of the other version (e.g., the local version or system version) and vice-versa.

Figure 10:
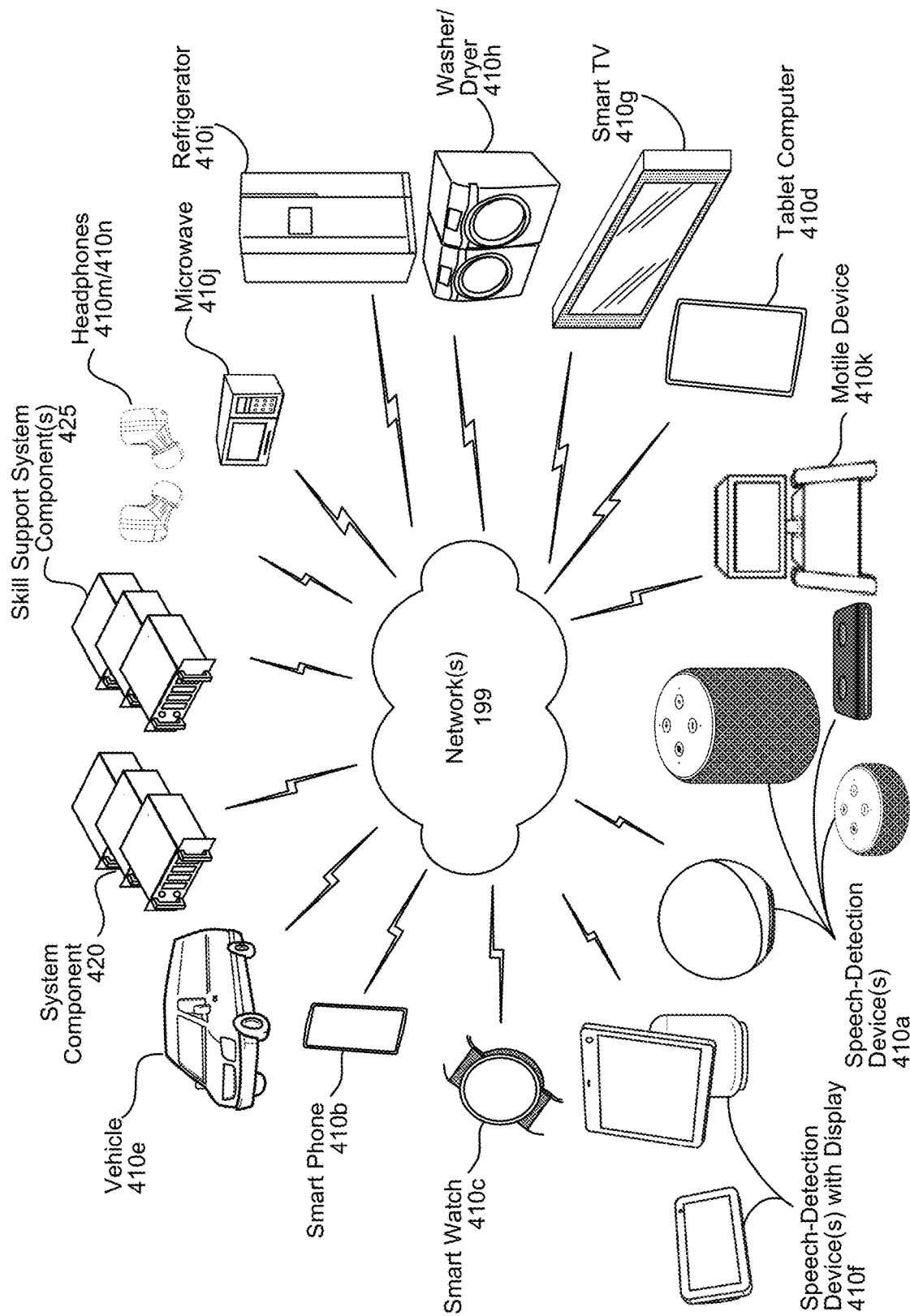
FIG. 10 illustrates an example of a computer network for use with the overall system, according to embodiments of the present disclosure.

As illustrated in FIG. 10, multiple devices (410a-410n, 410, 425) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user devices 410a, a smart phone 410b, a smart watch 410c, a tablet computer 410d, a vehicle 410e, a speech-detection device with display 410f, a display/smart television 410g, a washer/dryer 410h, a refrigerator 410i, a microwave 410j, autonomously motile user devices 410k (e.g., a robot), etc., may be connected to the network(s) 199 through a wireless service provider, over a Wi-Fi or cellular network connection, or the like. Other devices are included as network-connected support devices, such as the natural language command processing system component 420, the skill system component(s) 425, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of the natural language command processing system component 420.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first input data representing first acoustic feature data received from a first neural network of an automatic speech recognition (ASR) component;
processing the first input data using a first classifier component to determine a first plurality of softmax values representing respective likelihoods that the first input data corresponds to a first plurality of categories;
selecting, from a first plurality of feedforward neural networks and using the first plurality of softmax values, a first feedforward neural network to be used to process the first input data, the first plurality of feedforward neural networks including at least a second feedforward neural network different from the first feedforward neural network;
processing the first input data using the first feedforward neural network to generate first processed data;
processing the first input data using a second classifier component to determine a second plurality of softmax values representing respective likelihoods that the first input data corresponds to a second plurality of categories;
selecting, from a second plurality of feedforward neural networks and using the second plurality of softmax values, a third feedforward neural network to be used to process the first input data, the third feedforward neural network performing a null transformation, wherein the second plurality of feedforward neural networks includes at least a fourth feedforward neural network different from the third feedforward neural network and a fifth feedforward neural network different from the fourth feedforward neural network and the third feedforward neural network;
processing the first input data using the third feedforward neural network to generate second processed data;
determining first output data by summing, using the first plurality of softmax values and the second plurality of softmax values, the first processed data, the second processed data, and the first input data, the first output data representing first adapted acoustic feature data; and
processing the first output data using at least a second neural network of the ASR component to determine ASR output data.

2. The computer-implemented method of claim 1, further comprising:
receiving second output data from the second neural network;
in response to selecting the first feedforward neural network, processing the second output data using a sixth feedforward neural network of a third plurality of feedforward neural networks to generate third processed data;
in response to selecting the third feedforward neural network, processing the second output data using a seventh feedforward neural network of a fourth plurality of feedforward neural networks to generate fourth processed data; and determining the ASR output data using the third processed data, the fourth processed data, and the second output data.

3. A computer-implemented method comprising:

receiving first input data representing output of a first machine learning component;

processing the first input data using a first component to select a first neural network component of a first plurality of neural network components to be used to process the first input data, the first plurality of neural network components including at least a second neural network component different from the first neural network component;

processing the first input data using the first neural network component to generate first data;

processing the first input data using a second component to select a third neural network component of a second plurality of neural network components to be used to process the first input data, the second plurality of neural network components including at least a fourth neural network component different from the third neural network component;

processing the first input data using the third neural network component to generate second data;

determining first output data by combining the first data, the second data, and the first input data; and processing the first output data using a second machine learning component.

4. The computer-implemented method of claim 3, further comprising:

receiving second output data from the second machine learning component;

in response to selecting the first neural network component, processing the second output data using a sixth neural network component of a third plurality of neural network components to generate third processed data;

in response to selecting the third neural network component, processing the second output data using a seventh neural network component of a fourth plurality of neural network components to generate fourth processed data; and determining third output data using the third processed data, the fourth processed data, and the second output data.

5. The computer-implemented method of claim 3, further comprising:

determining, using the first component and the first input data, a first value representing a likelihood that the first input data corresponds to a first category associated with the first neural network component;

determining, using the first component and the first input data, a second value representing a likelihood that the first input data corresponds to a second category associated with the second neural network component;

determining weighted first data using the first data and the first value; and determining weighted second data using the second data and the second value, wherein:

the first output data is determined using the weighted first data and the weighted second data.

6. The computer-implemented method of claim 3, further comprising:

receiving second input data representing a second output of the first machine learning component;

processing the second input data using the first component to determine to apply a null transformation to the second input data to generate third data having null values;

processing the second input data using the second component to select the third neural network component to be used to process the second input data to generate fourth data; and determining, using the third data, the fourth data, and the second input data, second output data.

7. The computer-implemented method of claim 3, further comprising:

receiving second input data from the first machine learning component;

determining, based at least on the determination to process the first input data using the first neural network component, to process the second input data using the first neural network component to generate third processed data;

determining, based at least on the determination to process the first input data using the third neural network component, to process the second input data using the third neural network component to generate fourth processed data; and determining second output data using the third processed data, the fourth processed data, and the second input data.

8. The computer-implemented method of claim 3, further comprising:

receiving from the first machine learning component, first feature data representing first features determined using first training data;

processing the first feature data using first parameters of the first component to determine a first category corresponding to the first feature data;

receiving a first set of transformation values corresponding to the first category;

processing the first feature data using the first set of transformation values to determine first adapted feature data;

determining, using the first adapted feature data and first label data of the first training data, a second set of parameters of the first component, wherein processing the first input data using the first component includes processing the first input data using the second set of parameters; and determining, using the first adapted feature data and the first label data, a second set of transformation values, wherein processing the first input data using the first neural network component includes processing the first input data using the second set of transformation values.

9. The computer-implemented method of claim 8, further comprising:

receiving second feature data representing second features determined using second training data;

processing the second feature data using the first component and at least one of the first plurality of neural network components to determine second adapted feature data;

determining that an error between the second adapted feature data and second label data of the second training data fails to satisfy a condition;

in response to determining that the error fails to satisfy the condition, processing the second feature data using third parameters of the second component to determine a second category corresponding to the second feature data;
processing the second feature data using a third set of transformation values to determine third adapted feature data;
determining, using the third adapted feature data and second label data of the second training data, a fourth set of parameters, wherein processing the first input data using the second component includes processing the first input data using the fourth set of parameters; and
determining, using the third adapted feature data and the second label data, a fourth set of transformation values, wherein the fourth neural network component corresponds to the fourth set of transformation values.

10. The computer-implemented method of claim 3, further comprising:
processing the first input data using a first neural network layer of the first neural network component to generate first intermediate data representing a first intermediate projection of the first input data, wherein the first input data has a first dimensionality and the first intermediate data has a second dimensionality that is less than the first dimensionality; and
processing the first intermediate data using a second neural network layer of the first neural network component to generate the first data, wherein the first data has the first dimensionality.

11. The computer-implemented method of claim 10, further comprises:
processing the first input data using a third neural network layer of the fourth neural network component to generate second intermediate data, wherein the second intermediate data has a third dimensionality that is greater than the second dimensionality; and
processing the first intermediate data using a fourth neural network layer of the fourth neural network component to generate third data.

12. A system, comprising:
at least one processor; and
at least one memory comprising instructions that, when executed by the at least one processor, cause the system to:
receive first input data representing output of a first machine learning component;
process the first input data using a first component to select a first neural network component of a first plurality of neural network components to be used to process the first input data, the first plurality of neural network components including at least a second neural network component different from the first neural network component;
process the first input data using the first neural network component to generate first data;
process the first input data using a second component to select a third neural network component of a second plurality of neural network components to be used to process the first input data, the second plurality of neural network components including at least a fourth neural network component different from the third neural network component;
process the first input data using the third neural network component to generate second data;
determine first output data by combining the first data, the second data, and the first input data; and
process the first output data using a second machine learning component.

13. The system of claim 12, wherein the at least one memory further includes instructions that, when executed by the at least one processor, further cause the system to:
receive second output data from the second machine learning component;
in response to selecting the first neural network component, process the second output data using a sixth neural network component of a third plurality of neural network components to generate third processed data;
in response to selecting the third neural network component, process the second output data using a seventh neural network component of a fourth plurality of neural network components to generate fourth processed data; and
determine third output data using the third processed data, the fourth processed data, and the second output data.

14. The system of claim 12, wherein the at least one memory further includes instructions that, when executed by the at least one processor, further cause the system to:
receive second input data representing a second output of the first machine learning component;
process the second input data using the first component to determine to apply a null transformation to the second input data to generate third data having null values;
process the second input data using the second component to select the third neural network component to be used to process the second input data to generate fourth data; and
determine, using the third data, the fourth data, and the second input data, second output data.

15. The system of claim 12, wherein the at least one memory further includes instructions that, when executed by the at least one processor, further cause the system to:
receive second input data from the first machine learning component;
determine, based at least on the determination to process the first input data using the first neural network component, to process the second input data using the first neural network component to generate third processed data;
determine, based at least on the determination to process the first input data using the third neural network component, to process the second input data using the third neural network component to generate fourth processed data; and
determine second output data using the third processed data, the fourth processed data, and the second input data.

16. The system of claim 12, wherein the at least one memory further includes instructions that, when executed by the at least one processor, further cause the system to:
receive from the first machine learning component, first feature data representing first features determined using first training data;
process the first feature data using first parameters of the first component to determine a first category corresponding to the first feature data;
receive a first set of transformation values corresponding to the first category;
process the first feature data using the first set of transformation values to determine first adapted feature data;
determine, using the first adapted feature data and first label data of the first training data, a second set of parameters of the first component, wherein processing the first input data using the first component includes processing the first input data using the second set of parameters; and determine, using the first adapted feature data and the first label data, a second set of transformation values, wherein processing the first input data using the first neural network component includes processing the first input data using the second set of transformation values.

17. The system of claim 16, wherein the at least one memory further includes instructions that, when executed by the at least one processor, further cause the system to:

receive second feature data representing second features determined using second training data;

process the second feature data using the first component and at least one of the first plurality of neural network components to determine second adapted feature data;

determine that an error between the second adapted feature data and second label data of the second training data fails to satisfy a condition;

in response to determining that the error fails to satisfy the condition, process the second feature data using third parameters of the second component to determine a second category corresponding to the second feature data;

process the second feature data using a third set of transformation values to determine third adapted feature data;

determine, using the third adapted feature data and second label data of the second training data, a fourth set of parameters, wherein processing the first input data using the second component includes processing the first input data using the fourth set of parameters; and determine, using the third adapted feature data and the second label data, a fourth set of transformation values, wherein the fourth neural network component corresponds to the fourth set of transformation values.

18. The system of claim 12, wherein the at least one memory further includes instructions that, when executed by the at least one processor, further cause the system to:

process the first input data using a first neural network layer of the first neural network component to generate first intermediate data representing a first intermediate projection of the first input data, wherein the first input data has a first dimensionality and the first intermediate data has a second dimensionality that is less than the first dimensionality; and process the first intermediate data using a second neural network layer of the first neural network component to generate the first data, wherein the first data has the first dimensionality.

19. The system of claim 18, wherein the at least one memory further includes instructions that, when executed by the at least one processor, further cause the system to:

processing the first input data using a third neural network layer of the fourth neural network component to generate second intermediate data, wherein the second intermediate data has a third dimensionality that is greater than the second dimensionality; and processing the first intermediate data using a fourth neural network layer of the fourth neural network component to generate third data.

20. The system of claim 13, wherein the at least one memory further includes instructions that, when executed by the at least one processor, further cause the system to:

determine, using the first component and the first input data, a first value representing a likelihood that the first input data corresponds to a first category associated with the first neural network component;

determine, using the first component and the first input data, a second value representing a likelihood that the first input data corresponds to a second category associated with the second neural network component;

determine weighted first data using the first data and the first value; and determine weighted second data using the second data and the second value, wherein:

the first output data is determined using the weighted first data and the weighted second data.

\* \* \* \* \*